US007848519B2

(12) United States Patent
Kato et al.

(10) Patent No.: US 7,848,519 B2
(45) Date of Patent: Dec. 7, 2010

(54) VIDEO INFORMATION RECORDING APPARATUS AND METHOD, VIDEO INFORMATION REPRODUCING APPARATUS AND METHOD, RECORDING MEDIUM, AND PROGRAM

(75) Inventors: Motoki Kato, Kanagawa (JP); Masanobu Nakamura, Tokyo (JP)

(73) Assignee: Sony Corporation (JP)

( * ) Notice: Subject to any disclaimer, the term of this patent is extended or adjusted under 35 U.S.C. 154(b) by 372 days.

(21) Appl. No.: 11/583,324

(22) Filed: Oct. 19, 2006

(65) Prior Publication Data

US 2007/0154013 A1 Jul. 5, 2007

Related U.S. Application Data

(62) Division of application No. 10/267,171, filed on Oct. 9, 2002, now Pat. No. 7,508,940.

(30) Foreign Application Priority Data

Oct. 9, 2001 (JP) .............................. P2001-311525

(51) Int. Cl.
*H04N 7/167* (2006.01)

(52) U.S. Cl. ........................ 380/200; 713/176; 386/123; 382/100

(58) Field of Classification Search ................. 713/176; 382/100; 705/51; 369/120; 336/117; 348/220.1; 386/120, 123; 380/200
See application file for complete search history.

(56) References Cited

U.S. PATENT DOCUMENTS

| 6,011,901 | A  | * | 1/2000 | Kirsten .................... 386/123 |
| 6,424,795 | B1 | * | 7/2002 | Takahashi et al. ............ 386/120 |
| 6,643,382 | B1 |   | 11/2003 | Maeda et al. |
| 6,856,760 | B2 | * | 2/2005 | Takahashi et al. ............ 386/120 |
| 2002/0099661 | A1 | * | 7/2002 | Kii et al. ........................ 705/51 |

* cited by examiner

*Primary Examiner*—Thanhnga B Truong
(74) *Attorney, Agent, or Firm*—Lerner, David, Littenberg, Krumholz & Mentlik, LLP

(57) ABSTRACT

A video information recording apparatus includes a first obtaining unit operable to obtain video information to be recorded; a second obtaining unit operable to obtain thumbnail picture information to be recorded in correspondence with the video information; an encrypting unit operable to encrypt the thumbnail picture information; and a recording unit operable to record the video information and the encrypted thumbnail picture information onto a recording medium.

19 Claims, 23 Drawing Sheets

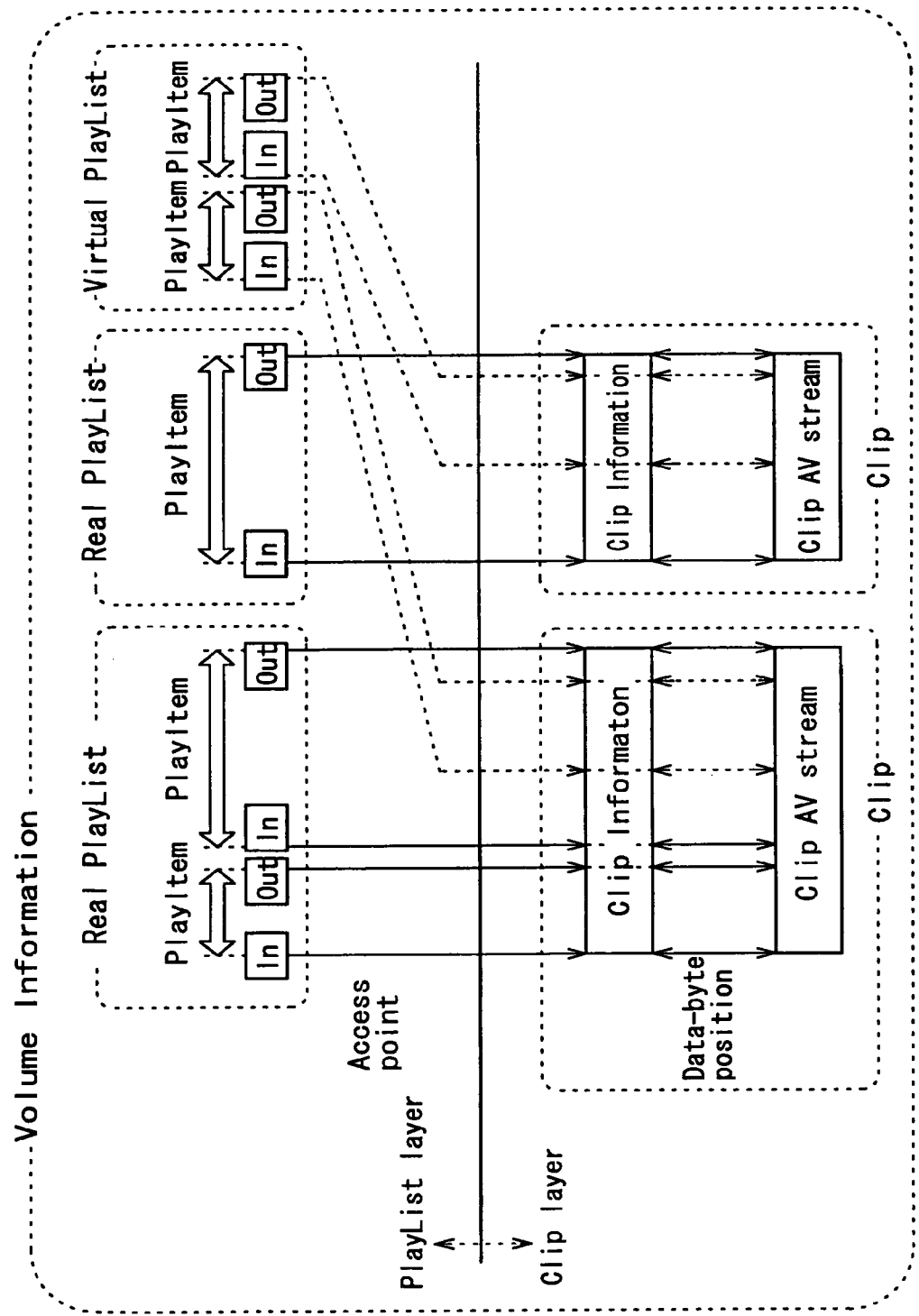
F I G. 1

F I G. 2
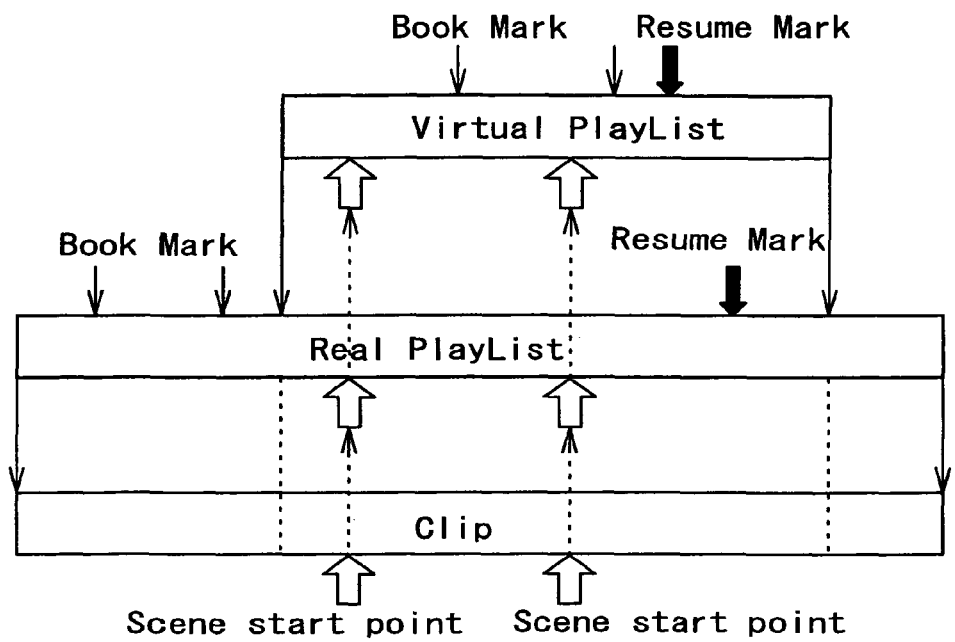
F I G. 3
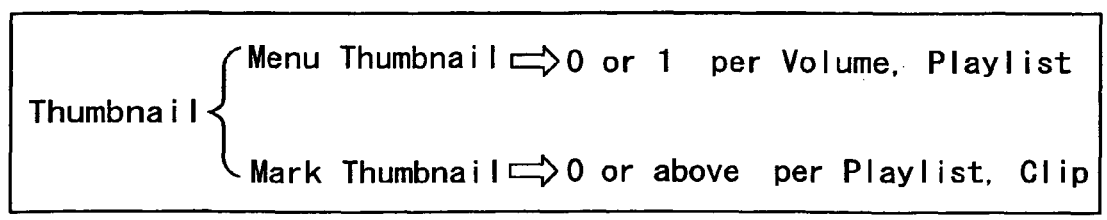

F I G. 4
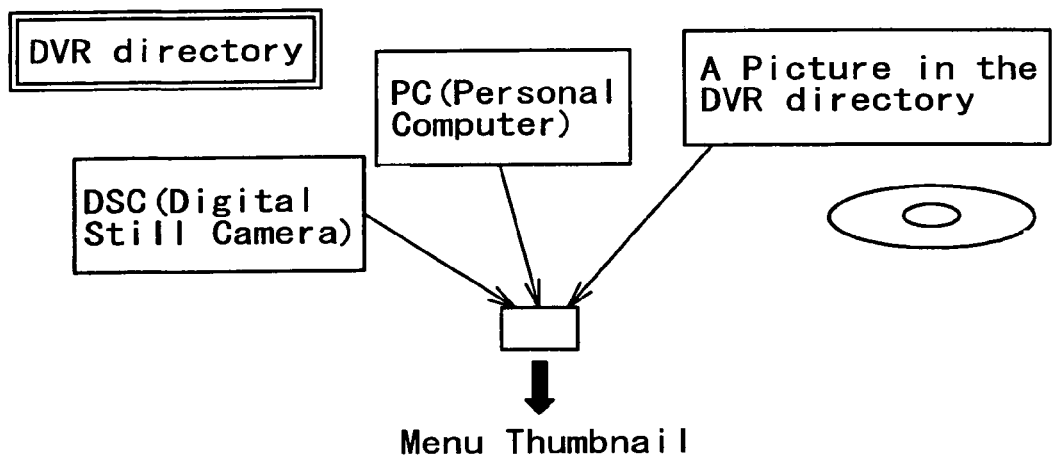
F I G. 5
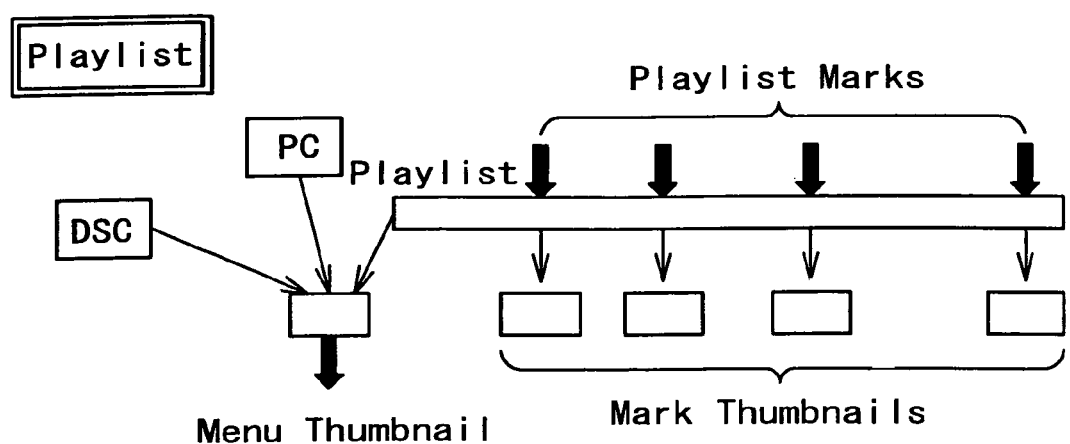

F I G. 9
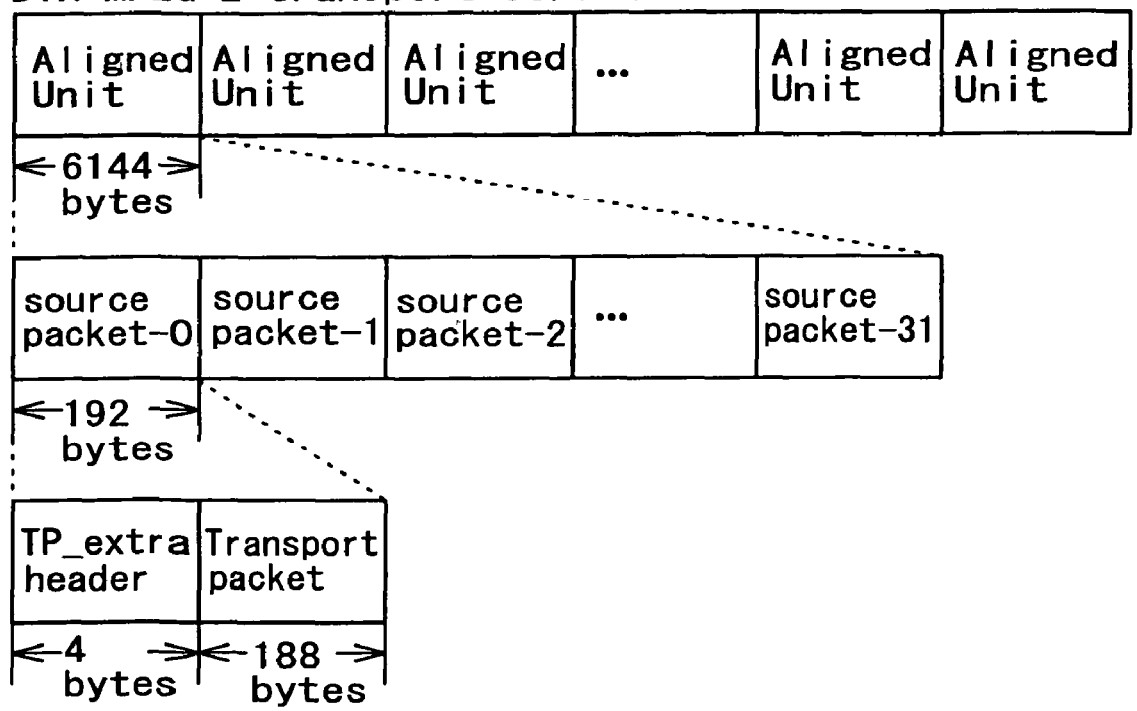

FIG. 10

| Syntax | No. of bits | Mnemonic |
|---|---|---|
| info.dvr { | | |
| ···(MIDDLE PART OMITTED) | | |
| UIAppInfoDVR() { | | |
| ref_to_menu_thumbnail_index | 16 | uimsbf |
| ... | | |
| } | | |
| ... | | |
| } | | |

FIG. 11

| Syntax | No. of bits | Mnemonic |
|---|---|---|
| xxxxx.rpls/yyyyy.vpls | | |
| ···(MIDDLE PART OMITTED) | | |
| PlayListMark() { | | |
| number_of_PlayList_marks | 16 | uimsbf |
| for(i=0; i<number_of_PlayList_marks; i++) { | | |
| mark_type | 7 | uimsbf |
| ref_to_PlayItem_id | 16 | uimsbf |
| mark_time_stamp | 32 | uimsbf |
| if(mark_type=="Representative picture of PlayList") { | | |
| ref_to_menu_thumbnail_index | 16 | uimsbf |
| } else { | | |
| ref_to_mark_thumbnail_index | 16 | uimsbf |
| } | | |
| } | | |
| } | | |
| ... | | |
| } | | |

FIG. 12

| Syntax | No. of bits | Mnemonic |
|---|---|---|
| zzzzz.clpi { | | |
| ・・・ ( MIDDLE PART OMITTED ) | | |
| ClipMark () { | | |
|     number_of_Clip_marks | 16 | uimsbf |
|     for (i=0; i<*number_of_Clip_marks*; i++) { | | |
|       mark_type | 7 | uimsbf |
|       ref_to_STC_id | 8 | uimsbf |
|       mark_time_stamp | 32 | uimsbf |
|       ref_to_mark_thumbnail_index | 16 | uimsbf |
|     } | | |
|   } | | |
| ・・・ | | |
| } | | |

F I G. 1 4
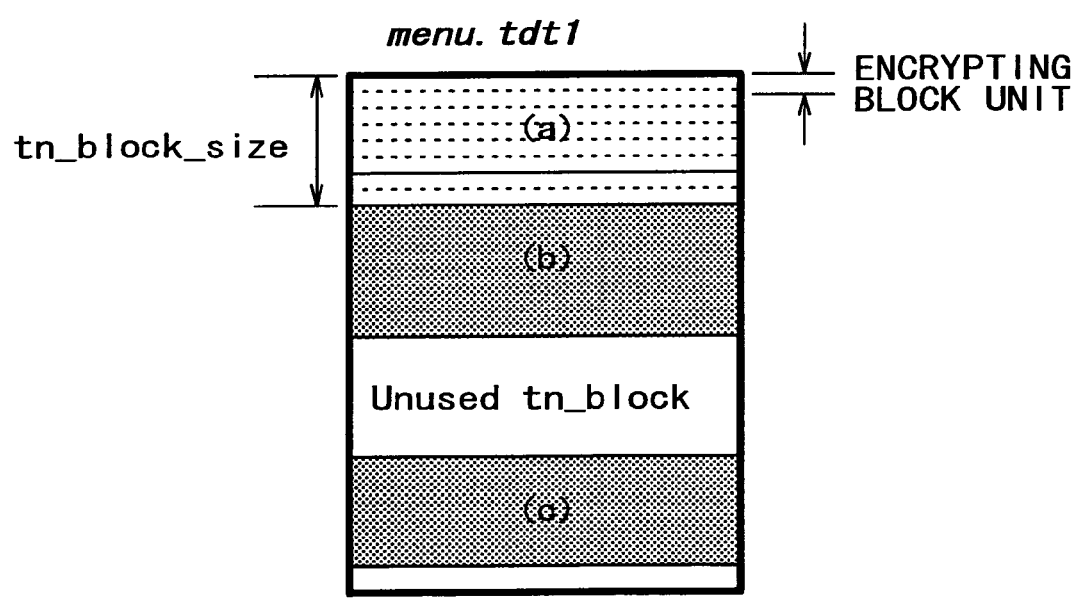

F I G. 1 5

| Syntax | No. of bits | Mnemonic |
|---|---|---|
| menu.tidx/mark.tidx{ | | |
|     number_of_thumbnails_1 | 16 | uimsbf |
|     number_of_tn_blocks_1 | 16 | uimsbf |
|     number_of_thumbnails_2 | 16 | uimsbf |
|     number_of_tn_blocks_2 | 16 | uimsbf |
|     tn_block_size | 16 | uimsbf |
|     recording_seed | N1 | bslbf |
|     for(i=0; i<*number_of_thumbnails_1*; i++) { | | |
|         thumbnail_index | 16 | uimsbf |
|         ref_to_tn_block_id_1 | 16 | uimsbf |
|         picture_byte_size_1 *[ref_to_tn_block_id_1]* | 32 | uimsbf |
|         horizontal_picture_size_1 *[ref_to_tn_block_id_1]* | 16 | uimsbf |
|         vertical_picture_size_1 *[ref_to_tn_block_id_1]* | 16 | uimsbf |
|     } | | |
|     for(i=0; i<*number_of_thumbnails_2*; i++) { | | |
|         thumbnail_index | 16 | uimsbf |
|         ref_to_tn_block_id_2 | 16 | uimsbf |
|         picture_byte_size_2 *[ref_to_tn_block_id_2]* | 32 | uimsbf |
|         horizontal_picture_size_2 *[ref_to_tn_block_id_2]* | 16 | uimsbf |
|         vertical_picture_size_2 *[ref_to_tn_block_id_2]* | 16 | uimsbf |
|     } | | |
| } | | |

FIG. 16

| Syntax | No. of bits | Mnemonic |
|---|---|---|
| menu.tdt_1/menu.tdt_2/mark.tdt_1/mark.tdt_2{ | | |
|   for(tn_block_id=0;tn_block_id<number_of_ tn_blocks;tn_block_id++) { | | |
|     tn_block( tn_block_id ) | tn_block size*1024*8 | |
|   } | | |
| } | | |

FIG. 17

| Syntax | No. of bits | Mnemonic |
|---|---|---|
| tn_block(tn_block_id) { | | |
|   thumbnail_picture[tn_block_id] | picture_byte_size_1[tn_block_id]*8 or picture_byte_size_2[tn_block_id]*8 | bslbf |
|   CP_Info_thumbnail() | N2*8 | bslbf |
|   if (i=0; i<NP; i++) { | | |
|     padding_byte | 8 | bslbf |
|   } | | |
| } | | |

FIG. 18

| Syntax | No. of bits | Mnemonic |
|---|---|---|
| CP_Info_thumbnail() { | | |
|     CCI_thumbnail | 2 | uimsbf |
|     APS_thumbnail | 2 | uimsbf |
| } | | |

FIG. 19

| CCI_thumbnail | meaning |
|---|---|
| 00 | copy free |
| 01 | no more copy |
| 10 | copy once |
| 11 | copy prohibited |

FIG. 20

| APS_thumbnail | meaning |
|---|---|
| 00 | copy free |
| 01 | APS is on:Type 1 (AGC) |
| 10 | APS is on:Type 2 (AGC+2L Colorstripe) |
| 11 | APS is on:Type 3 (AGC+4L Colorstripe) |

F I G. 2 4

| Syntax | No. of bits | Mnemonic |
|---|---|---|
| menu.tidx/mark.tidx{ | | |
|     number_of_thumbnails | 16 | uimsbf |
|     tn_block_size | | |
|     number_of_tn_blocks | 16 | uimsbf |
|     recording_seed | N1 | bslbf |
|     for(i=0; i<number_of_thumbnails; i++) { | | |
|         thumbnail_index | 16 | uimsbf |
|         ref_to_tn_block_id | 16 | uimsbf |
|         picture_byte_size[ref_to_tn_block_id] | 32 | uimsbf |
|         horizontal_picture_size[ref_to_tn_block_id] | 16 | uimsbf |
|         vertical_picture_size[ref_to_tn_block_id] | 16 | uimsbf |
|         flag_encrypted_thumbnail[ref_to_tn_block_id] | 1 | bslbf |
|     } | | |
| } | | |

F I G. 2 5

| Syntax | No. of bits | Mnemonic |
|---|---|---|
| menu.tdat/mark.tdat | | |
|     for(tn_block_id=0; tn_block_id<number_of_tn_blocks; tn_block_id ++) { | | |
|         tn_block(tn_block_id) | tn_block_size*1024*8 | |
|     } | | |
| } | | |

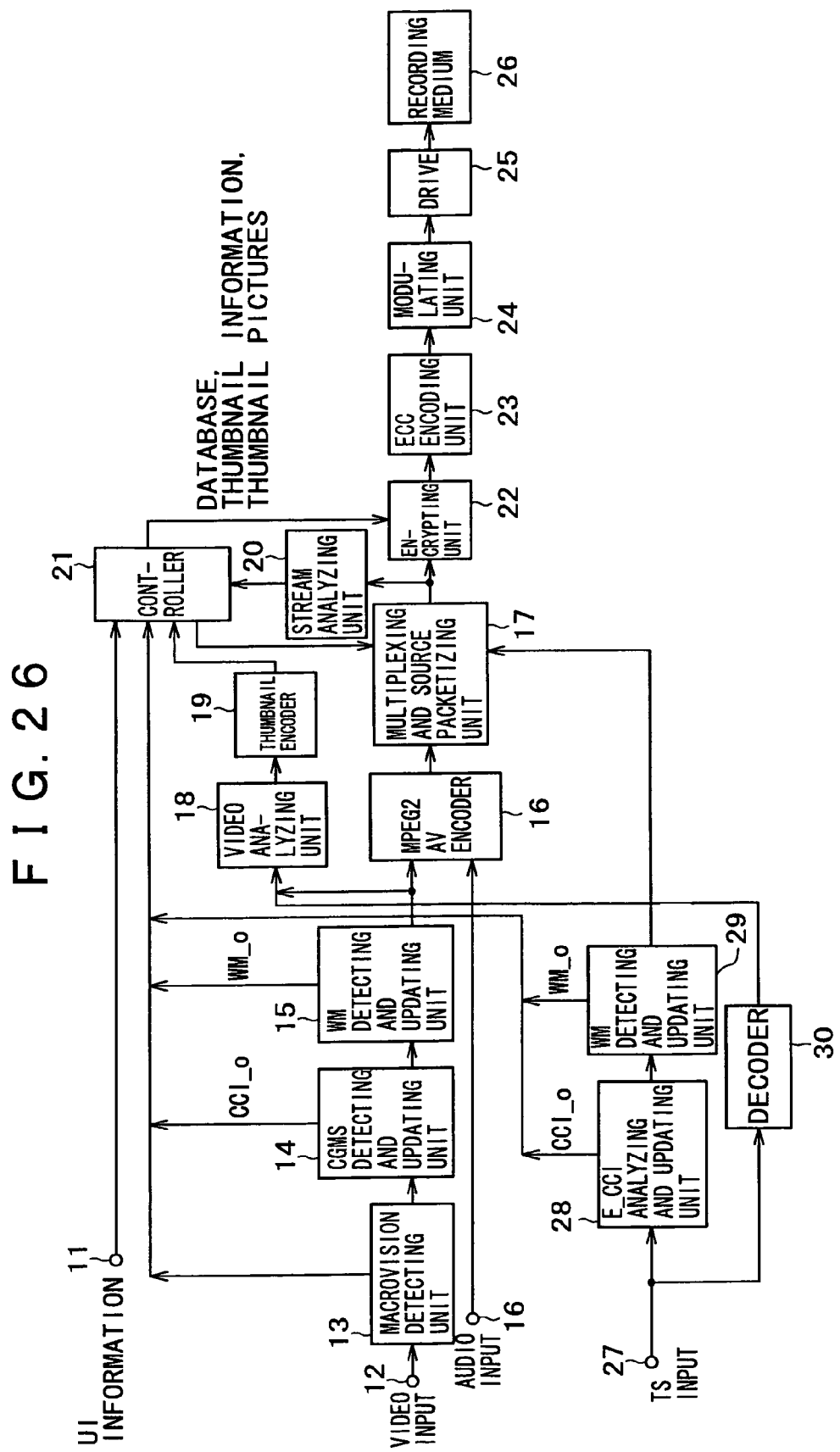

FIG. 27

| STATE OF INPUT SIGNAL | | STATE OF RECORDED AV STREAM AND THUMBNAIL | | | | | | |
|---|---|---|---|---|---|---|---|---|
| CGMS | WM | CCI_o | WM_o | E_CCI | CCI_thumbnail | APS_thumbnail | THUMBNAIL PICTURE ENCRYPTION ON/OFF |
| 00 | 00 | 00 | 00 | 00 | 00 | 00 | OFForON |
| 01 | 101 | UNRECORDABLE | | | | | |
| 10 | 10 | 01 | 101 | 01 | 01 | 00 | ON |
| 11 | 11 | UNRECORDABLE | | | | | |

00: copy free
01, 101: no more copy
10: copy once
11: copy prohibited

FIG. 28

| STATE OF INPUT SIGNAL | | | STATE OF RECORDED AV STREAM AND THUMBNAIL | | | | | |
|---|---|---|---|---|---|---|---|---|
| E_CCI | APS | WM | CCI_o | WM_o | E_CCI | CCI_thumbnail | APS_thumbnail | THUMBNAIL PICTURE ENCRYPTION ON/OFF |
| 00 | * | 00 | 00 | 00 | 00 | 00 | SAME AS STATE OF INPUT SIGNAL | OFForON |
| 01 | * | 101 | UNRECORDABLE | | | | | |
| 10 | * | 10 | 01 | 101 | 01 | 01 | SAME AS STATE OF INPUT SIGNAL | ON |
| 11 | * | 11 | UNRECORDABLE | | | | | |

VIDEO INFORMATION RECORDING APPARATUS AND METHOD, VIDEO INFORMATION REPRODUCING APPARATUS AND METHOD, RECORDING MEDIUM, AND PROGRAM

CROSS-REFERENCE TO RELATED APPLICATIONS

This application is a divisional of U.S. application Ser. No. 10/267,171, filed on Oct. 9, 2002 now U.S. Pat. No. 7,508,940, which claims priority from Japanese Application No. P2001-311525, filed Oct. 9, 2001, the disclosure of which is hereby incorporated by reference herein.

BACKGROUND OF THE INVENTION

The present invention relates to an apparatus and a method for recording video information, an apparatus and a method for reproducing video information, a recording medium, and a program, and particularly to an apparatus and a method for recording video information, an apparatus and a method for reproducing video information, a recording medium, and a program that can properly manage security information of an AV signal recorded on a recording medium.

Recently, various optical disks have been proposed as disk type information recording media detachable from recording and reproducing apparatus. Such recordable optical disks have been proposed as several-gigabyte large-capacity media, and are greatly expected as media for recording digital video (moving picture) signals.

One of the encoding methods for digitally compressing digital video information is an MPEG (Motion Picture Experts Group) 2 method. MPEG2 is also applied to the case where digital video information is recorded on a recording medium. When analog video information is to be recorded on a recording medium, for example, the video information is encoded into an MPEG2 form, and then an encoded bit stream is recorded on the medium. Also, in the case of the recently launched digital television broadcasting, a video program encoded by the MPEG2 method is transmitted in a format referred to as a transport stream. When a digital broadcast is to be recorded on a recording medium, a method is used which records the transport stream as a digital signal without decoding or re-encoding the transport stream.

When video information is recorded on a recording medium in a digital signal format, the video information can be copied onto other recording media without any degradation. However, this presents a serious problem to copyrighters of the video contents. Accordingly, in order to restrict the copying of video information, a method is used which provides video information with CCI (Copy Control Information) indicating copy generation management information of "Copy Free (copy permitted)," "Copy Once (copy permitted only for one generation)," "No More Copy (copy not permitted for generations subsequent to the present generation)," and "Copy Prohibited (copy not permitted)." For example, there is a CGMS (Copy Generation Management System) signal, and a CGMS signal for an analog interface is referred to as CGMS-A and a CGMS signal for a digital interface is referred to as CGMS-D. The analog CGMS-A is also referred to as VBID because an ID is superimposed in a VBI (Vertical Blanking Interval) of the video information. This is standardized as EIAJ CP-1204.

There is a method of encoding a descriptor having CCI in order to transmit the information in a transport stream. Descriptors of this type include a DTCP descriptor defined by DTLA (Digital Transmission Licensing Administrator) and a digital_copy_control_descriptor defined by ARIB and used in Japanese BS digital broadcasting. For more severe copy restriction, a method has recently been considered which embeds copy generation management information referred to as a watermark in baseband video information or an MPEG video stream. Standardization of watermarks is currently under way, and a Millennium format and a Galaxy format have been proposed.

When video information is recorded on a recording medium, recording restriction is required to be imposed properly according to the CCI of the input signal. In general, a user can record video information on a recording medium only when the CCI of the input signal indicates either "Copy Free (free copying permitted)" or "Copy Once (copy permitted only for one generation)." When the CCI of the input signal indicates "Copy Once (copy permitted only for one generation)," the CCI of the video information on the recording medium needs to be updated to "No More Copy (copy not permitted for generations subsequent to the present generation)."

For easy grasping of contents of video information recorded on a recording medium, a still picture representative of the contents and a picture obtained by extracting as a still picture a particular scene from the contents may be recorded separately from the video information. These still pictures are referred to as thumbnail pictures. By displaying a list of such thumbnail pictures on a menu screen for a user to select a reproduction start point of the video information recorded on the recording medium, it is possible to provide a user-friendly interface. A thumbnail picture may be a picture selected from the recorded video information, or may be a picture captured from a personal computer, a digital still camera or the like into the recording medium.

As described in the related art, considerable attention is paid to the management of contents protection information when video information is recorded on a recording medium. On the other hand, no attention is paid to the management of contents protection information when a thumbnail picture is recorded. This is expected to present a problem in the future. More specifically, when recording in the digital video information format becomes dominant in the future, proper management of contents protection information is also expected to be required when a thumbnail picture is recorded. For example, a picture of a popular character in a movie or a television program is often copyrighted, and therefore illegal copying of the picture presents a problem to the copyrighter.

When a picture selected from input video information with CCI indicating "Copy Once" is recorded as a thumbnail picture on a recording medium, the thumbnail picture should be managed with "No More Copy" as with the contents. Also the thumbnail picture should be encrypted and then recorded. Thereby, even if a malicious person illegally copies the thumbnail picture onto another recording medium as identical data on a bit-by-bit basis, it is possible to prevent reproduction of the illegally copied thumbnail picture.

Thus, when video information with CCI indicating "Copy Once" is to be recorded, the video recorder should be provided with the function of encrypting and recording the video information and thumbnail pictures thereof. The encrypting method may use DES, Triple-DES, or AES, for example.

On the other hand, there may be a video recorder as a product for recording only video information with CCI indicating "Copy Free." For example, current terrestrial analog TV broadcasting can be handled as contents with CCI indicating "Copy Free" when used only by a general user himself/herself, and thus there may be a video recorder for recording only terrestrial analog TV broadcasts. In this case, the video recorder does not need to have a function of encrypting video information and thumbnail pictures thereof for recording (of course, the video recorder may encrypt and record video information and thumbnail pictures thereof).

When an application of recording video information and thumbnail pictures thereof is considered, in a case of a removable recording medium for a video recorder, encrypted thumbnail pictures and non-encrypted thumbnail pictures may be mixed with each other on the recording medium. In this case, when there is no system provided for distinguishably managing the encrypted thumbnail pictures and the non-encrypted thumbnail pictures, there occurs a problem of not knowing which pictures are the encrypted thumbnail pictures and which pictures are the non-encrypted thumbnail pictures on the recording medium.

SUMMARY OF THE INVENTION

The present invention has been made in view of the above, and it is accordingly an object of the present invention to provide a system for distinguishably managing thumbnail pictures recorded on a recording medium after being encrypted and thumbnail pictures recorded on a recording medium without being encrypted, where the encrypted thumbnail pictures and the non-encrypted thumbnail pictures may be mixed with each other.

It is another object of the present invention to provide a system that, when a thumbnail picture is to be reproduced from a recording medium on which video information, a representative picture of the video information, and thumbnail pictures representing characteristic points are recorded, reads information for distinguishing between encrypted thumbnail pictures and non-encrypted thumbnail pictures and then reproduces the thumbnail picture on the basis of the read information.

According to a first aspect of the present invention, there is provided a video information recording apparatus including a first obtaining unit operable to obtain video information to be recorded; a second obtaining unit operable to obtain thumbnail picture information to be recorded in correspondence with the video information; an encrypting unit operable to encrypt the thumbnail picture information; and a recording unit operable to record the video information and the encrypted thumbnail picture information onto a recording medium.

The video information recording apparatus can further include a determining unit operable to determine whether the thumbnail picture information is to be encrypted.

The second obtaining unit can obtain the thumbnail picture information from the video information.

The determining unit can determine whether the thumbnail picture information is to be encrypted on the basis of contents protection information for the video information.

The determining unit can determine that the thumbnail picture information is to be encrypted when the contents protection information for the video information allows copying once.

The recording unit can further record contents protection information for the thumbnail picture information.

The encrypting unit can further encrypt the contents protection information for the thumbnail picture information.

The recording unit can record the thumbnail picture information using a predetermined block as a unit.

The encrypting unit can encrypt one piece of the thumbnail picture information within the predetermined block.

The recording unit can further record distinguishing information for distinguishing the encrypted thumbnail picture information being recorded.

The recording unit can record the thumbnail picture information and the distinguishing information in respective objects independent of each other.

The recording unit can record the encrypted thumbnail picture information in a first object of the object of the thumbnail picture information and can record non-encrypted thumbnail picture information in a second object of the object of the thumbnail picture information.

The recording unit can record the encrypted thumbnail picture information and non-encrypted thumbnail picture information in an identical object using a predetermined block as a unit.

The predetermined block can be a block of an error correction unit.

According to a second aspect of the present invention, there is provided a method for recording video information onto a recording medium, including obtaining video information to be recorded; obtaining thumbnail picture information to be recorded in correspondence with the video information; encrypting the thumbnail picture information; and recording the video information and the encrypted thumbnail picture information onto the recording medium.

According to a third aspect of the present invention, there is provided a recording medium recorded with a computer readable program for recording video information onto a recording medium. The program includes obtaining video information to be recorded; obtaining thumbnail picture information to be recorded in correspondence with the video information; encrypting the thumbnail picture information; and recording the video information and the encrypted thumbnail picture information onto the recording medium.

According to a fourth aspect of the present invention, there is provided a video information recording system for recording video information onto a recording medium, the system including a processor operable to execute instructions; and instructions, the instructions including obtaining video information to be recorded; obtaining thumbnail picture information to be recorded in correspondence with the video information; encrypting the thumbnail picture information; and recording the video information and the encrypted thumbnail picture information onto the recording medium.

According to a fifth aspect of the present invention, there is provided a video information reproducing apparatus including a reproducing unit operable to reproduce a signal recorded on a recording medium; an extracting unit operable to extract encrypted thumbnail picture information from the reproduced signal; a decrypting unit operable to decrypt the encrypted thumbnail picture information; and an output unit operable to output the decrypted thumbnail picture information.

The extracting unit can further extract distinguishing information from the reproduced signal, the distinguishing information distinguishing the encrypted thumbnail picture information.

The video information reproducing apparatus can further include a determining unit operable to determine whether the thumbnail picture information is to be decrypted on the basis of the distinguishing information.

The extracting unit can further extract contents protection information for the thumbnail picture information.

The decrypting unit can further decrypt the contents protection information.

The reproducing unit can reproduce the thumbnail picture information using a predetermined block as a unit.

The decrypting unit can decrypt one piece of the thumbnail picture information within the predetermined block.

The reproducing unit can reproduce the thumbnail picture information and the distinguishing information from respective objects independent of each other.

The reproducing unit can reproduce the encrypted thumbnail picture information from a first object of the object of the thumbnail picture information and can reproduce non-encrypted thumbnail picture information from a second object of the object of the thumbnail picture information.

The reproducing unit can reproduce the encrypted thumbnail picture information and non-encrypted thumbnail picture information using a predetermined block of an identical object as a unit.

The predetermined block can be a block of an error correction unit.

According to a sixth aspect of the present invention, there is provided a method for reproducing video information recorded on a recording medium. The method includes reproducing a signal recorded on the recording medium; extracting encrypted thumbnail picture information from the reproduced signal; decrypting the encrypted thumbnail picture information; and outputting the decrypted thumbnail picture information.

According to a seventh aspect of the present invention, there is provided a recording medium recorded with a computer readable program for reproducing video information recorded on a recording medium, the program including reproducing a signal recorded on the recording medium; extracting encrypted thumbnail picture information from the reproduced signal; decrypting the encrypted thumbnail picture information; and outputting the decrypted thumbnail picture information.

According to an eighth aspect of the present invention, there is provided a video information reproducing system for reproducing video information recorded on a recording medium, the system including a processor operable to execute instructions; and instructions, the instructions including reproducing a signal recorded on the recording medium; extracting encrypted thumbnail picture information from the reproduced signal; decrypting the encrypted thumbnail picture information; and outputting the decrypted thumbnail picture information.

According to a ninth aspect of the present invention, there is provided a recording medium, including a recordable portion; and information recorded on the recordable portion, the information including video information; an encrypted thumbnail picture of the video information; and distinguishing information for distinguishing the encrypted thumbnail picture.

The video information recording apparatus and method, the recording medium, and the video information recording system according to the present invention record encrypted thumbnail picture information on a recording medium.

The video information reproducing apparatus and method, the recording medium, and the video information reproducing system according to the present invention decrypt encrypted thumbnail picture information and output the thumbnail picture information.

The recording medium according to the present invention has recorded thereon an encrypted thumbnail picture and distinguishing information for distinguishing the encrypted thumbnail picture.

BRIEF DESCRIPTION OF THE DRAWINGS

FIG. 1 is a diagram of assistance in explaining the structure of an application format;

FIG. 2 is a diagram of assistance in explaining marks on a PlayList and marks on a Clip;

FIG. 3 is a diagram of assistance in explaining Menu Thumbnails and Mark Thumbnails;

FIG. 4 is a diagram of assistance in explaining the Menu Thumbnails;

FIG. 5 is a diagram of assistance in explaining marks attached to a PlayList;

FIG. 9 is a diagram of assistance in explaining the structure of a DVR MPEG-2 transport stream;

FIG. 10 is a diagram showing the syntax of UIAppInfoDVR;

FIG. 11 is a diagram showing the syntax of PlayListMark;

FIG. 12 is a diagram showing the syntax of ClipMark;

FIG. 14 is a diagram of assistance in explaining encryption;

FIG. 15 is a diagram showing the syntax of a thumbnail information file;

FIG. 16 is a diagram showing the syntax of a Menu Thumbnail picture file;

FIG. 17 is a diagram showing the syntax of a tn_block;

FIG. 18 is a diagram showing the syntax of a CP_Info_thumbnail( );

FIG. 19 is a diagram of assistance in explaining a CCI_thumbnail;

FIG. 20 is a diagram of assistance in explaining an APS_t-humbnail;

FIG. 24 is a diagram showing the syntax of a thumbnail information file;

FIG. 25 is a diagram showing the syntax of a thumbnail picture file;

FIG. 26 is a block diagram showing the configuration of a recording apparatus to which the present invention is applied;

FIG. 27 is a diagram of assistance in explaining copy control processing when an AV stream is recorded;

FIG. 28 is a diagram of assistance in explaining copy control processing when a transport stream is input;

DETAILED DESCRIPTION

Figure 6:
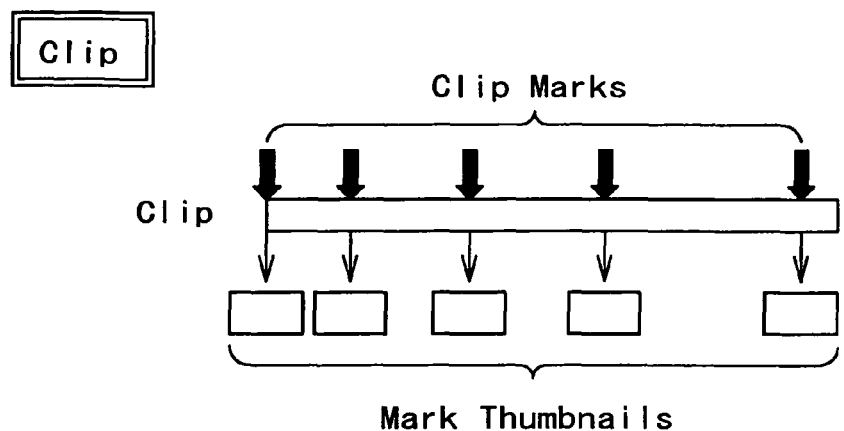
FIG. 6 is a diagram of assistance in explaining marks attached to a Clip.

FIG. 1 shows a simplified structure of an application format on a recording medium used in a recording and reproducing system according to the present invention. The format has two layers, that is, a PlayList layer and a Clip layer to control an AV stream. Volume Information manages all Clips and PlayLists within the disk.

A pair of one AV stream and information attached to the AV stream is considered to be one object, and is referred to as a Clip. An AV stream file is referred to as a Clip AV stream file, and information attached thereto is referred to as a Clip Information file.

One Clip AV stream file stores data obtained by arranging an MPEG2 transport stream into a structure defined by a DVR application format.

In general, while a data file used in a computer or the like is handled as a byte string, contents of a Clip AV stream file are extended on a time axis. A PlayList specifies an access point in the Clip mainly by a time stamp. When the PlayList indicates an access point in the Clip by a time stamp, the Clip Information file serves to find information on an address where stream decoding is to be started in the Clip AV stream file.

The PlayList has been introduced for the purpose of allowing a user to select a reproducing section desired to be viewed by the user from the Clip and readily edit the section. One PlayList is a collection of reproducing sections in the Clip. One reproducing section in a Clip is referred to as a PlayItem, which is represented by a pair of an IN point and an OUT point on the time axis. Thus, the PlayList is a collection of PlayItems.

There are two types of PlayLists. One is a Real PlayList, and the other is a Virtual PlayList. A Real PlayList is considered to have in common the stream portion of the Clip that the Real PlayList refers to. That is, a Real PlayList occupies a data space within the disk corresponding to the stream portion of the Clip that the Real PlayList refers to. When an AV stream is recorded as a new Clip, a Real PlayList referring to a reproducible range of the entire Clip is automatically produced. When a part of the reproducible range of the Real PlayList is erased, data is also erased in the stream portion of the Clip that the Real PlayList refers to. A Virtual PlayList is considered not to have in common the data of a Clip. Even when a Virtual PlayList is changed or erased, Clips are not changed at all.

In the description below, the Real PlayList and the Virtual PlayList are collectively referred to simply as a PlayList.

Marks are provided to specify a highlight and characteristic time in a Clip and a PlayList (see FIG. 2).

A mark added to a Clip specifies a scene characteristic of contents of the AV stream. For example, the mark specifies a scene change point or the like. When a PlayList is played, a mark of a Clip that the PlayList refers to can be used by reference.

A mark added to a PlayList is set mainly by a user. For example, the mark represents a bookmark, a resume point or the like.

A mark is set to a Clip or a PlayList by adding a time stamp indicating the time of the mark to a mark list. Deleting a mark means removing the time stamp of the mark from the mark list. Thus, neither setting nor deleting a mark changes the AV stream at all.

A thumbnail is a still picture added to a Volume (disk), a PlayList, and a Clip. There are two kinds of thumbnails, as shown in FIG. 3. One is a thumbnail as a picture representative of contents. This is mainly used on a menu screen for a user to select a desired item by operating a cursor. The other is a picture representing a scene indicated by a mark.

As shown in FIG. 3, either zero Menu Thumbnails or one Menu Thumbnail is provided for each disk (Volume) or PlayList, and zero or more Mark Thumbnails are provided for each PlayList or Clip.

Figure 7:
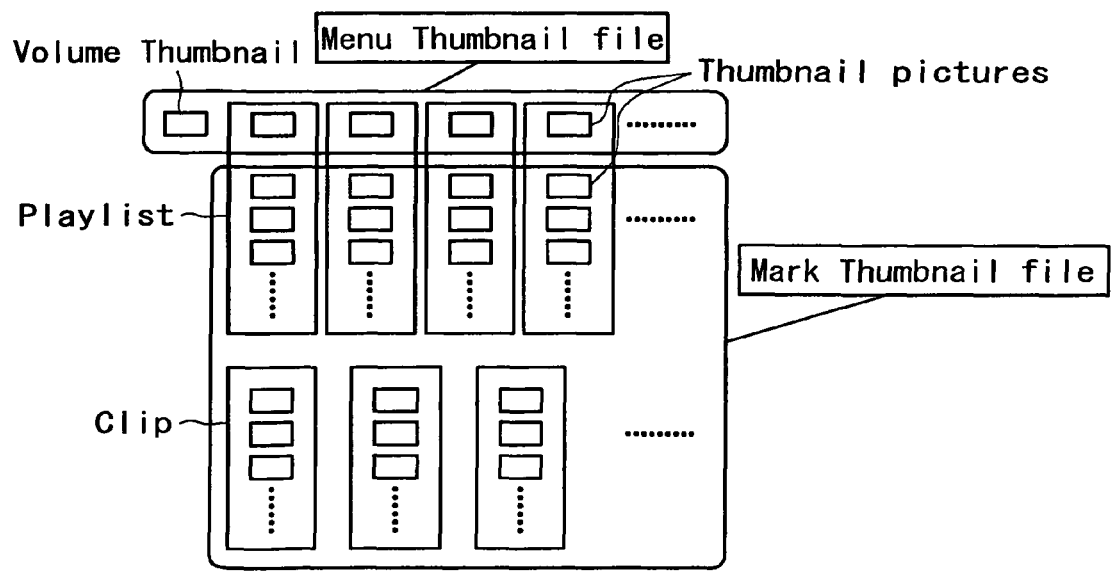
FIG. 7 is a diagram of assistance in explaining files storing thumbnails.

The Volume and each PlayList are allowed to have a representative picture. It is assumed that a representative picture of the Volume is, for example, used to first display a still picture representing the contents of a disk when the disk is inserted into the player (see Menu Thumbnail in FIG. 4). It is assumed that a representative picture of a PlayList is used as a still picture representing the contents of the PlayList on a menu screen for selecting a PlayList (see Menu Thumbnail in FIG. 5). While the simplest method of realizing a representative picture of a PlayList uses the first picture of the PlayList as a thumbnail, the first picture at a reproduction time of 0 is not necessarily a picture most suitable for representing the contents. It is for this reason that an arbitrary picture can be set as the thumbnail of a PlayList. The two kinds of thumbnails described above are referred to as Menu Thumbnail. Since the Menu Thumbnail is displayed frequently, it is required that the Menu Thumbnail be able to be read from the disk at high speed. In order to meet this requirement, all Menu Thumbnails are stored in a single file for efficiency (see a Menu Thumbnail file in FIG. 7 to be described later). A Menu Thumbnail is not necessarily limited to a picture extracted from moving pictures within the Volume, and may be a picture captured from a personal computer (PC), a digital still camera (DSC) or the like (FIG. 4).

On the other hand, it is required that a plurality of marks be able to be set to a Clip and a PlayList, and a picture at a mark point needs to be able to be viewed readily so that the contents at the mark position are known. Such a picture indicating a mark point is referred to as a Mark Thumbnail (see Mark Thumbnails in FIG. 5 and Mark Thumbnails in FIG. 6). Hence, the thumbnail is generated mainly from a picture extracted at a mark point rather than an externally captured picture. Unlike the Menu Thumbnail, the Mark Thumbnail is used in a submenu or the like for use in showing details of a PlayList, and therefore short access time is not required for the Mark Thumbnail. Thus, some time taken by the player to open the file and read part of the file each time the thumbnail is required does not present a problem. In order to reduce the number of files present within the Volume, it is desirable to store all Mark Thumbnails in a single file (see a Mark Thumbnail file in FIG. 7). While a PlayList is allowed to have one Menu Thumbnail and a plurality of Mark Thumbnails, a Clip has no Menu Thumbnail because the Clip does not need to be selected directly by a user (normally specified via the PlayList).

Figure 8:
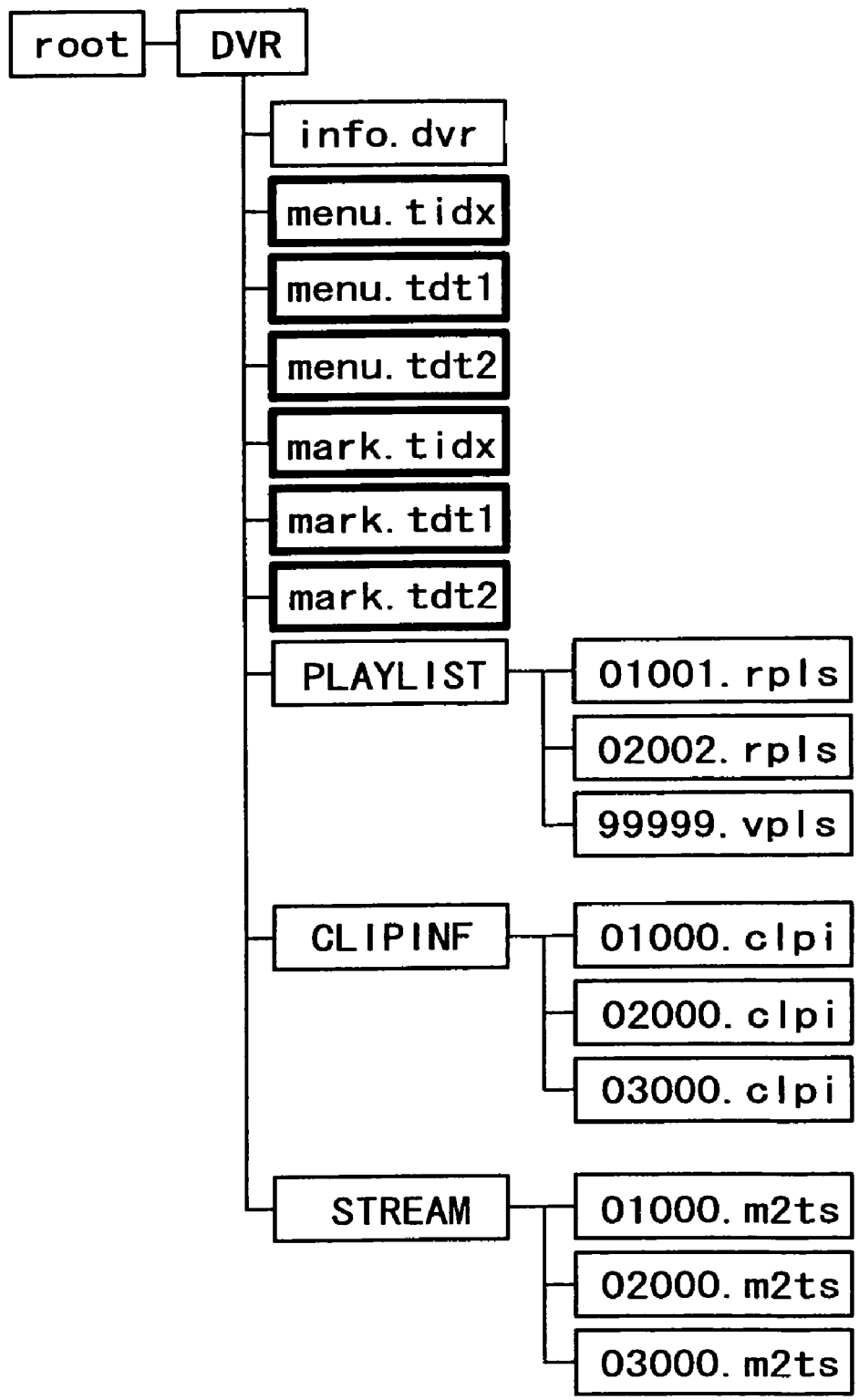
FIG. 8 is a diagram of assistance in explaining a directory structure constructed on a disk.

The directories necessary on a DVR disk are as follows: a root directory including a "DVR" directory, and the "DVR" directory including a "PLAYLIST" directory, a "CLIPINF" directory, and a "STREAM" directory. FIG. 8 shows an example of the directory structure on the DVR disk.

The root directory includes one directory. "DVR"—All files and directories specified by a DVR application format need to be stored under this directory.

The "DVR" directory stores the following files.

"info.dvr"—A file storing general information of an application layer created under the "DVR" directory. Only one info.dvr file needs to be present under the "DVR" directory. The name of the file is fixed to info.dvr.

"menu.tidx," "menu.tdt1," and "menu.tdt2"—The three files store information related to Menu Thumbnail pictures.

The menu.tidx file is a "thumbnail information file" storing header information of Menu Thumbnail pictures.

The menu.tdt1 file is a first "thumbnail picture file" storing picture data of the Menu Thumbnail pictures, and is a file for recording encrypted thumbnail pictures.

The menu.tdt2 file is a second "thumbnail picture file" storing picture data of the Menu Thumbnail pictures, and is a file for recording non-encrypted thumbnail pictures.

When the video recorder has a function of encrypting Menu Thumbnail pictures and recording the encrypted Menu Thumbnail pictures, the Menu Thumbnail pictures can be recorded in the menu.tdt1 file. A Menu Thumbnail picture generated from video information with CCI indicating "Copy Once" is stored in the menu.tdt1 file. A Menu Thumbnail picture generated from video information with CCI indicating "Copy Free" may be stored in the menu.tdt1 file.

When the video recorder records only video information having CCI of "Copy Free" and has no function of encrypting Menu Thumbnail pictures and recording the encrypted Menu Thumbnail pictures, the Menu Thumbnail pictures are recorded in the menu.tdt2 file.

Information on whether each of the Menu Thumbnail pictures is encrypted or not (that is, information on whether a Menu Thumbnail picture is stored in the menu.tdt1 file or in the menu.tdt2 file) is stored in the menu.tidx file.

By collectively managing information on whether each thumbnail picture is encrypted or not in the thumbnail information file of menu.tidx, the thumbnail information file can be managed in a database of a relatively small size. Thus, when an instruction for reproduction of a thumbnail picture is given, information on whether the thumbnail is encrypted or not can be obtained readily and quickly.

"mark.tidx," "mark.tdt1," and "mark.tdt2"—The three files store information related to Mark Thumbnail pictures.

The mark.tidx file is a "thumbnail information file" storing header information of Mark Thumbnail pictures.

The mark.tdt1 file is a first "thumbnail picture file" storing picture data of the Mark Thumbnail pictures, and is a file for recording encrypted thumbnail pictures.

The mark.tdt2 file is a second "thumbnail picture file" storing picture data of the Mark Thumbnail pictures, and is a file for recording non-encrypted thumbnail pictures.

A method of determining whether to record a Mark Thumbnail picture in the mark.tdt1 file or in the mark.tdt2 file and effects of separately managing the thumbnail information file and the thumbnail picture files are the same as in the above description of Menu Thumbnails.

The "DVR" directory includes three directories.

"PLAYLIST"—Database files of Real PlayLists and Virtual PlayLists need to be placed under this directory.

"CLIPINF"—A database of Clips needs to be placed under this directory.

"STREAM"—AV stream files need to be placed under this directory.

The "PLAYLIST" directory stores two kinds of PlayList files: Real PlayList and Virtual PlayList.

"xxxxx.rpls"—This file stores information related to one Real PlayList. One such file is created for each Real PlayList. The name of the file is "xxxxx.rpls," where "xxxxx" denotes five figures from 0 to 9. An extension of the file needs to be "rpls."

"yyyyy.vpls"—This file stores information related to one Virtual PlayList. One such file is created for each Virtual PlayList. The name of the file is "yyyyy.vpls," where "yyyyy" denotes five figures from 0 to 9. An extension of the file needs to be "vpls."

The "CLIPINF" directory stores one file in correspondence with each AV stream file.

"zzzzz.clpi"—This file is a Clip Information file corresponding to one AV stream file (Clip AV stream file or Bridge-Clip AV stream file). The name of the file is "zzzzz.clpi," where "zzzzz" denotes five figures from 0 to 9. An extension of the file needs to be "clpi."

The "STREAM" directory stores AV stream files.

"zzzzz.m2ts"—This file is an AV stream file handled by the DVR system. The file is a Clip AV stream file or a Bridge-Clip AV stream file. The name of the file is "zzzzz.m2ts," where "zzzzz" denotes five figures from 0 to 9. An extension of the file needs to be "m2ts." An AV stream file and the Clip Information file corresponding to the AV stream file need to use the same five figures "zzzzz."

The structure of an AV stream file will now be described. The AV stream file needs to have the structure of a DVR MPEG2 transport stream, as shown in FIG. 9. The DVR MPEG2 transport stream has the following characteristics:

The DVR MPEG2 transport stream comprises an integral number of Aligned units.

The size of an Aligned unit is 6144 bytes (2048*3 bytes).

An Aligned unit is started with a first byte of source packets.

A source packet has a length of 192 bytes. One source packet is formed of a TP_extra_header field and a transport packet. The TP_extra_header field has a length of four bytes, and the transport packet has a length of 188 bytes.

One Aligned unit is formed of 32 source packets.

The last Aligned unit in the DVR MPEG2 transport stream is also formed of 32 source packets.

When the last Aligned unit is not completely filled with transport packets of the input transport stream, a remaining byte area needs to be filled with source packets having a null packet (transport packet with PID=0x1FFF).

The TP_extra_header field includes copy restricting information of a payload of the transport packet and an arrival time stamp indicating the time of arrival of the transport packet at a decoder.

A database format for managing reproduction information of AV stream files will next be described.

FIG. 10 shows the syntax of UIAppInfoDVR, a part of the data stored in the info.dvr file. A ref_to_menu_thumbnail_index field indicates information of a thumbnail picture representative of the Volume. When the ref_to_menu_thumbnail_index field has a value other than 0xFFFF, a thumbnail picture has been added to the Volume, and the thumbnail picture is stored in the menu.tdt1 file or the menu.tdt2 file. The picture is referred to by using a value of thumbnail_index in the menu.tidx file (to be described later). 0xFFFF in the ref_to_menu_thumbnail_index field indicates that no thumbnail picture has been added to the Volume.

FIG. 11 shows the syntax of PlayListMark, a part of the data stored in a PlayList file. The PlayListMark stores information of a mark added to a PlayList. Information of a representative picture of a PlayList is also included in the PlayListMark.

A number_of_PlayList_marks field indicates the number of mark entries stored in the PlayListMark.

A mark_type field indicates a mark type.

A ref_to_PlayItem_id field indicates the value of a PlayItem_id for specifying a PlayItem where a mark is set.

A mark_time_stamp field stores a time stamp indicating a point where the mark is set.

A ref_to_menu_thumbnail_index field indicates information of a thumbnail picture showing a representative picture of a PlayList. When the ref_to_menu_thumbnail_index field has a value other than 0xFFFF, a thumbnail picture showing the representative picture of the PlayList is present, and the thumbnail picture is stored in the menu.tdt1 file or the menu.tdt2 file. The picture is referred to by using a value of thumbnail_index in the menu.tidx file (to be described later). 0xFFFF in the ref_to_menu_thumbnail_index field indicates that there is no thumbnail picture showing a representative picture of the PlayList.

A ref_to_mark_thumbnail_index field indicates information of a thumbnail picture added to a mark. When the ref_to_mark_thumbnail_index field has a value other than 0xFFFF, a thumbnail picture has been added to the mark, and the thumbnail picture is stored in the mark.tdt1 file or the mark.tdt2 file. The picture is referred to by using a value of thumbnail_index in the mark.tidx file (to be described later). 0xFFFF in the ref_to_mark_thumbnail_index field indicates that no thumbnail picture has been added to the mark.

FIG. 12 shows the syntax of ClipMark, a part of data stored in a Clip Information file. The ClipMark stores information of a mark added to a Clip.

A number_of_Clip_marks field indicates the number of mark entries stored in the ClipMark.

A mark_type field indicates a mark type.

A ref_to_STC_id field contains information for specifying a system time-based time base of a Clip where a mark_time_stamp is set.

The mark_time_stamp represents a point where a mark is set in a Clip AV stream using a presentation time stamp as a basis.

A ref_to_mark_thumbnail_index field indicates information of a thumbnail picture added to a mark. When the ref_to_mark_thumbnail_index field has a value other than 0xFFFF, a thumbnail picture has been added to the mark, and the thumbnail picture is stored in the mark.tdt1 file or the mark.tdt2 file. The picture is referred to by using a value of thumbnail_index in the mark.tidx file (to be described later). 0xFFFF in the ref_to_mark_thumbnail_index field indicates that no thumbnail picture has been added to the mark.

The contents of files storing information regarding thumbnails will next be described.

The "menu.tidx," "menu.tdt1," and "menu.tdt2" files store information of Menu Thumbnails, that is, one picture representative of the Volume and one picture representative of each PlayList. The header information of the Menu Thumbnails is collectively managed in one menu.tidx file. The picture data of the Menu Thumbnails is stored in the menu.tdt1 or menu.tdt2 file.

The "mark.tidx," "mark.tdt1," and "mark.tdt2" files store information of Mark Thumbnails, that is, pictures specified by a mark point. The header information of the Mark Thumbnails added to all Clips and PlayLists in the Volume is collectively managed in one mark.tidx file. The picture data of the Mark Thumbnails is stored in the mark.tdt1 or mark.tdt2 file.

A thumbnail picture is data obtained by encoding a picture by JPEG, for example. Since JPEG is widely used as a de facto standard, JPEG is implemented relatively easily, and has a high degree of compatibility. It is to be noted that the format of a thumbnail picture is not limited to JPEG; an MPEG I-picture, PNG, GIF, TIFF and the like may be used.

Since thumbnails are added and deleted frequently, the adding operation and part deleting operation must be able to be performed easily and quickly. For this reason, the menu.tdt1, menu.tdt2, mark.tdt1, and mark.tdt2 files have a block structure. One thumbnail picture is stored in one block referred to as a tn_block.

Figure 13:
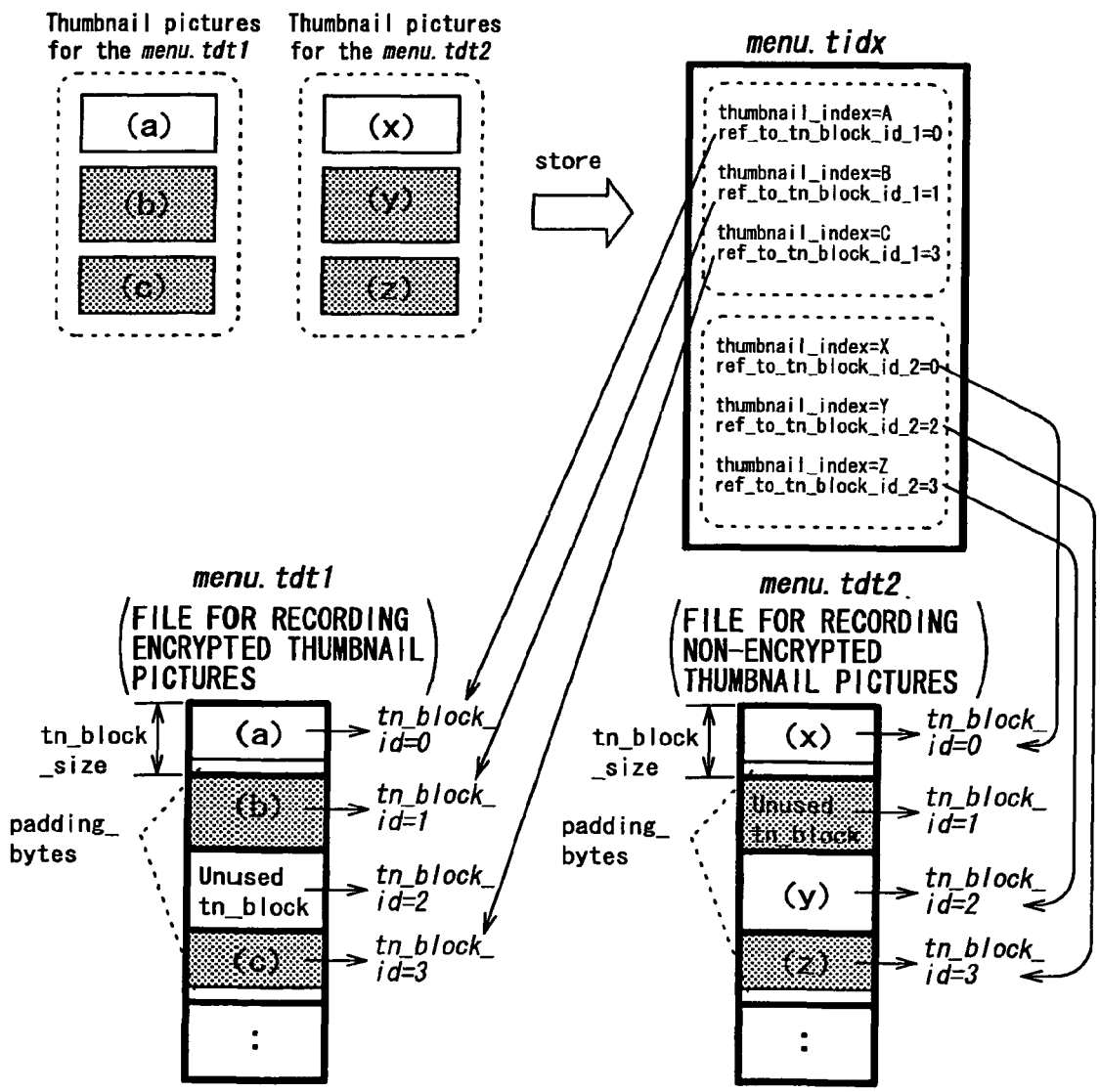
FIG. 13 is a diagram of assistance in explaining a method of storing thumbnail picture data in tn_blocks.

FIG. 13 shows an example of usage of tn_blocks.

In this example, thumbnail pictures indicated by (a), (b), and (c) are stored in the menu.tdt1 file, and thumbnail pictures indicated by (x), (y), and (z) are stored in the menu.tdt2 file. In the menu.tidx file, (a), (b), and (c) are each provided with two values of thumbnail_index (A, B, C) and ref_to_tn_block_id_1 (0, 1, 3). In the menu.tidx file, (x), (y), and (z) are each provided with two values of thumbnail_index (X, Y, Z) and ref_to_tn_block_id_2 (0, 2, 3). In the menu.tdt1 file, the thumbnail pictures (a), (b), and (c) are stored in their respective tn_blocks (blocks 0, 1, and 3) indicated by the ref_to_tn_block_id_1. In the menu.tdt2 file, the thumbnail pictures (x), (y), and (z) are stored in their respective tn_blocks (blocks 0, 2, and 3) indicated by the ref_to_tn_block_id_2.

There may be unused tn_blocks (tn_block No. 2 in the menu.tdt1 file and tn_block No. 1 in the menu.tdt2 file) in tn_block sequences of the menu.tdt1 and menu.tdt2 files. For example, when deleting a thumbnail, erasing a thumbnail_index entered in the menu.tidx file and making no change to the thumbnail picture file results in an unused tn_block in the tn_block sequence.

FIG. 14 is a diagram of assistance in explaining an encrypting method of a file (the menu.tdt1 file shown in FIG. 13) for encrypting thumbnail pictures and recording the encrypted thumbnail pictures. As shown in FIG. 14, one tn_block is divided into an integral number of one or more encrypting blocks, and data within the block is encrypted in units of the encrypting blocks. The encrypting method uses DES, Triple-DES, or AES, for example. Encryption processing is thus closed in one tn_block. As a result, when an arbitrary thumbnail picture is to be read from the thumbnail picture file, it suffices to decrypt only the tn_block that stores the thumbnail picture, so that the amount of data processing can be minimized.

The syntax and semantics of files storing information on thumbnails will next be described.

The "menu.tidx" file and the "mark.tidx" file have the same syntax structure. FIG. 15 shows an example of the syntax structure of the "menu.tidx" and the "mark.tidx" files.

A number_of_thumbnails_1 field indicates the number of thumbnail pictures stored in the menu.tdt1 file in the case of the menu.tidx file, and indicates the number of thumbnail pictures stored in the mark.tdt1 file in the case of the mark.tidx file.

A number_of_tn_blocks_1 field denotes the number of tn_blocks in the menu.tdt1 file in the case of the menu.tidx file, and denotes the number of tn_blocks in the mark.tdt1 file in the case of the mark.tidx file.

A number_of_thumbnails_2 field indicates the number of thumbnail pictures stored in the menu.tdt2 file in the case of the menu.tidx file, and the number of thumbnail pictures stored in the mark.tdt2 file in the case of the mark.tidx file.

A number_of_tn_blocks_2 field denotes the number of tn_blocks in the menu.tdt2 file in the case of the menu.tidx file, and denotes the number of tn_blocks in the mark.tdt2 file in the case of the mark.tidx file.

A tn_block_size field indicates the size of one tn_block in the menu.tdt1 and menu.tdt2 files in the case of the menu.tidx file, and indicates the size of one tn_block in the mark.tdt1 and mark.tdt2 files in the case of the mark.tidx file. The size has 1024 bytes as a unit. For example, tn_block_size=16 indicates that the size of one tn_block is 16*1024 bytes. One thumbnail picture needs to be stored in one tn_block.

A recording_seed is a random number value used for processing of encrypting data in the menu.tdt1 file in the case of the menu.tidx file, and is a random number value used for processing of encrypting data in the mark.tdt1 file in the case of the mark.tidx file. When a recorder creates a menu.tdt1 file on a disk for the first time, the recorder generates the recording_seed and stores the recording_seed in the menu.tidx file. Also, when the recorder creates a mark.tdt1 file on the disk for the first time, the recorder generates the recording_seed and stores the recording_seed in the mark.tidx file.

A thumbnail_index is an index number for the ref_to_tn_block_id_1 field following the thumbnail_index when included in a loop of a for statement having the number_of_thumbnails_1 as a variable. Alternatively, the thumbnail_index indicates an index number for the ref_to_tn_block_id_2 field following the thumbnail_index when included in a loop of a for statement having the number_of_thumbnails_2 as a variable. A value of 0xFFFF must not be used for the thumbnail_index. In the case of the menu.tidx file, the thumbnail_index is referred to by the ref_to_menu_thumbnail_index field in the UIAppInfoVolume( ) and PlayListMark( ). In the case of the mark.tidx file, the thumbnail_index is referred to by the ref_to_mark_thumbnail_index field in the PlayListMark( ) and ClipMark( ). A thumbnail_index of the same value must not repeat in the menu.tidx file or in the mark.tidx file.

A ref_to_tn_block_id_1 field indicates one tn_block in the menu.tdt1 file in the case of the menu.tidx file. The tn_block stores a thumbnail picture corresponding to the thumbnail_index, or the index number of the ref_to_tn_block_id_1 field. Alternatively, the ref_to_tn_block_id_1 field indicates one tn_block in the mark.tdt1 file in the case of the mark.tidx file. The tn_block stores a thumbnail picture corresponding to the thumbnail_index, or the index number of the ref_to_tn_block_id_1 field.

A picture_byte_size_1 field [ref_to_tn_block_id_1] indicates, in bytes, the length of data of the thumbnail picture stored in the tn_block indicated by the ref_to_tn_block_id_1 field. The value of the picture_byte_size_1 [ref_to_tn_block_id_1] needs to be (1024*tn_block_size–N1) bytes or less (N1 will be described later with reference to FIG. 17). That is, the recorder needs to perform encoding such that the data length of one thumbnail picture is (1024*tn_block_size–N1) bytes or less.

A horizontal_picture_size_1 field [ref_to_tn_block_id_1] indicates the number of pixels in a horizontal direction of the thumbnail picture stored in the tn_block indicated by the ref_to_tn_block_id_1 field.

A vertical_picture_size_1 field [ref_to_tn_block_id_1] indicates the number of pixels in a vertical direction of the thumbnail picture stored in the tn_block indicated by the ref_to_tn_block_id_1 field.

A ref_to_tn_block_id_2 field indicates one tn_block in the menu.tdt2 file in the case of the menu.tidx file. The tn_block stores a thumbnail picture corresponding to the thumbnail_index, or the index number of the ref_to_tn_block_id_2 field. Alternatively, the ref_to_tn_block_id_2 field indicates one tn_block in the mark.tdt2 file in the case of the mark.tidx file. The tn_block stores a thumbnail picture corresponding to the thumbnail_index, or the index number of the ref_to_tn_block_id_2 field.

A picture_byte_size_2 field [ref_to_tn_block_id_2] indicates, in bytes, the length of data of the thumbnail picture stored in the tn_block indicated by the ref_to_tn_block_id_2 field. The value of the picture_byte_size_2 field [ref_to_tn_block_id_2] needs to be (1024*tn_block_size–N1) bytes or less (N1 will be described later with reference to FIG. 17). That is, the recorder needs to perform encoding such that the data length of one thumbnail picture is (1024*tn_block_size–N1) bytes or less.

A horizontal_picture_size_2 field [ref_to_tn_block_id_2] indicates the number of pixels in a horizontal direction of the thumbnail picture stored in the tn_block indicated by the ref_to_tn_block_id_2 field.

A vertical_picture_size_2 field [ref_to_tn_block_id_2] indicates the number of pixels in a vertical direction of the thumbnail picture stored in the tn_block indicated by the ref_to_tn_block_id_2 field.

FIG. 16 shows the syntax structure of the "menu.tdt1," the "menu.tdt2," the "mark.tdt1," and the "mark.tdt2" files. These files have the same syntax structure.

A tn_block field (tn_block_id) indicates one tn_block by the argument of a tn_block_id in a tn_block sequence. In the case of the menu.tdt1 file, the value of the tn_block_id is referred to by the ref_to_tn_block_id_1 field in the menu.tidx file. In the case of the menu.tdt2 file, the value of the tn_block_id is referred to by the ref_to_tn_block_id_2 field in the menu.tidx file.

In the case of the mark.tdt1 file, the value of the tn_block_id is referred to by the ref_to_tn_block_id_1 field in the mark.tidx file.

In the case of the mark.tdt2 file, the value of the tn_block_id is referred to by the ref_to_tn_block_id_2 field in the mark.tidx file.

FIG. 17 shows the syntax of the tn_block (tn_block_id).

A thumbnail_picture field [tn_block_id] is an area for storing one thumbnail picture indicated by the value of the tn_block_id. The first byte of the thumbnail picture needs to coincide with the first byte of the thumbnail_picture [tn_block_id].

A CP_Info_thumbnail( ) is N1-byte information indicating the contents protection information of the thumbnail picture stored in the thumbnail_picture [tn_block_id]. Details of the CP_Info_thumbnail( ) will be described later.

A padding_byte is an arbitrary one-byte value. A value of NP is calculated so as to satisfy the following equation:

$$NP = tn\_block\_size*1024 - picture\_byte\_size[tn\_block\_id] - N1$$

FIG. 18 shows the syntax of the CP_Info_thumbnail( ).

A CCI_thumbnail indicates copy generation management information of the thumbnail picture. FIG. 19 shows the meanings of the value of the CCI_thumbnail. Specifically, "00" represents "copy free"; "01" represents "no more copy"; "10" represents "copy once"; and "11" represents "copy prohibited."

An APS_thumbnail field indicates analog copy protection information when the thumbnail picture is output in an analog video form. FIG. 20 shows the meanings of the value of the APS_thumbnail. Each APS definition is described in Default Settings of the Macrovision Anti-taping Process for DVD Products, Revision 1.0, Jul. 5, 1997. Incidentally, a 2L/4L Colorstripe is applicable only in the case of NTSC analog output.

Since the menu.tdt1 file and the mark.tdt1 file are encrypted and then recorded, the following two effects are obtained.

It is possible to prevent the information of the CP_Info_thumbnail( ) from being altered by a malicious user.

Even if a thumbnail picture having a CCI_thumbnail indicating "no more copy" is illegally copied onto another recording medium as identical data on a bit-by-bit basis, it is possible to prevent reproduction of the thumbnail picture.

In the above description, the Menu Thumbnail picture file is divided into two files for encrypted thumbnails and non-encrypted thumbnails (the same is true for Mark Thumbnail pictures). As another example, description will next be made of a case where switching between encrypted thumbnail portions and non-encrypted thumbnail portions is performed within a single Menu Thumbnail picture file.

In this case, Menu Thumbnail pictures are stored in a single menu.tdat file, and Mark Thumbnail pictures are stored in a single mark.tdat file. (The menu.tdt1 and menu.tdt2 files in the file structure of FIG. 8 are changed into a single menu.tdat file, and the mark.tdt1 and mark.tdt2 files in the file structure of FIG. 8 are changed into a single mark.tdat file.)

Figure 21:
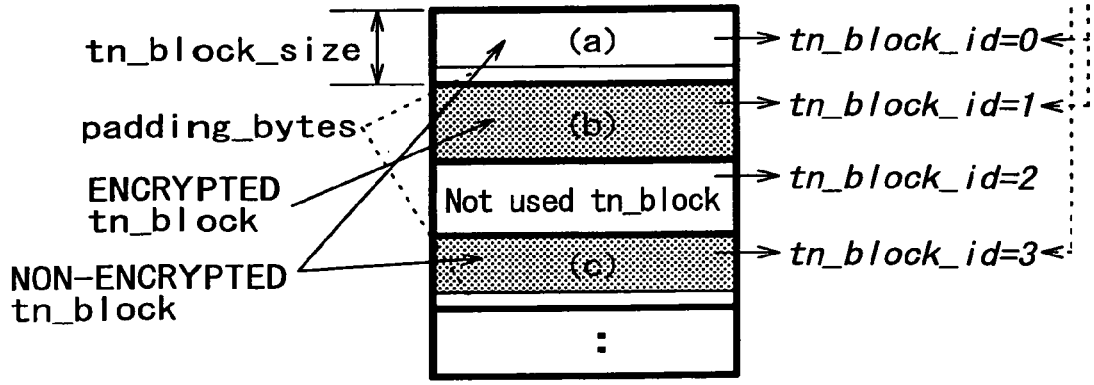
FIG. 21 is a diagram of assistance in explaining a method of storing thumbnail picture data in tn_blocks.

FIG. 21 shows an example of the usage of tn_blocks in this case.

Thumbnail pictures indicated by (a), (b), and (c) (of the thumbnail pictures, the thumbnail picture (b) is to be encrypted and recorded) are stored in the menu.tdat file. In the menu.tidx file, (a), (b), and (c) are each provided with three values of a thumbnail_index (X, Y, Z), a ref_to_tn_block_id (0, 1, 3), and a flag_encrypted_thumbnail (0, 1, 0). In the menu.tdat file, (a), (b), and (c) are stored in the tn_blocks indicated by their respective ref_to_tn_block_ids (0, 1, and 3). Thus, even when encrypted thumbnails and non-encrypted thumbnails are mixed with each other, the encrypted thumbnails and non-encrypted thumbnails can be managed easily.

There may be unused tn_blocks in a tn_block sequence of the menu.tdat file. For example, when deleting a thumbnail, erasing a thumbnail_index entered in the menu.tidx file and making no change to the thumbnail picture file results in an unused tn_block in the tn_block sequence.

Two examples of an encryption switching method in a case where switching between encrypted thumbnail portions and non-encrypted thumbnail portions is performed within the single Menu Thumbnail picture file will be described with reference to FIG. 22 and FIG. 23.

Figure 22:
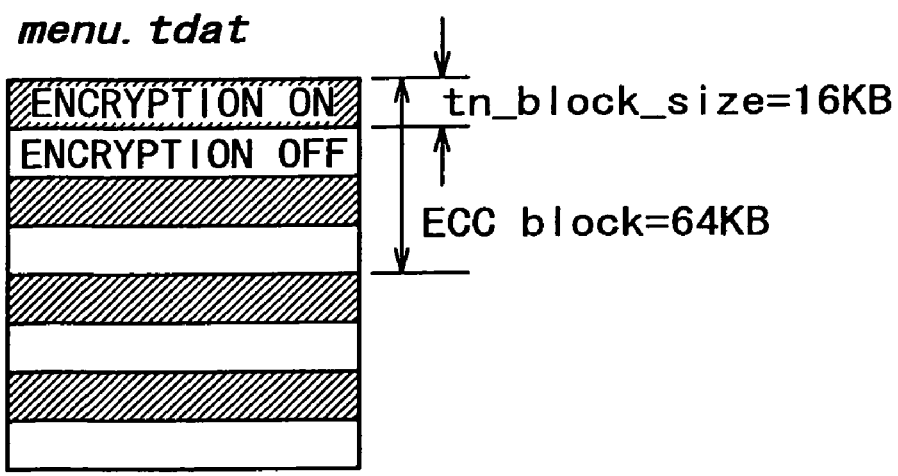
FIG. 22 is a diagram of assistance in explaining encryption in units of a tn_block.

FIG. 22 shows a case where switching between encryption and non-encryption is performed in a unit of a tn_block. FIG. 23 shows a case where switching between encryption and non-encryption is performed in a unit of a plurality of connected tn_blocks. In the latter case, when the size of a tn_block is 16 KB and an ECC block unit is 64 KB, for example, switching between encryption and non-encryption is performed for each unit of 64 KB.

The syntax of the thumbnail information file when switching between encrypted thumbnail portions and non-encrypted thumbnail portions is performed within the single Menu Thumbnail picture file (same for the Mark Thumbnail picture file) will now be described.

The "menu.tidx" and "mark.tidx" files have the same syntax structure. FIG. 24 shows an example of the syntax structure of the "menu.tidx" and "mark.tidx" files.

A number_of_thumbnails field indicates the number of thumbnail pictures stored in the menu.tdat file in the case of the menu.tidx file, and the number of thumbnail pictures stored in the mark.tdat file in the case of the mark.tidx file.

A tn_block_size field indicates the size of one tn_block in the menu.tdat file in the case of the menu.tidx file, and indicates the size of one tn_block in the mark.tdat file in the case of the mark.tidx file.

A number_of_tn_blocks field denotes the number of tn_blocks in the menu.tdat file in the case of the menu.tidx file, and denotes the number of tn_blocks in the mark.tdat file in the case of the mark.tidx file.

The recording_seed is a random number value used for processing of encrypting data in the menu.tdat file in the case of the menu.tidx file, and is calculated by a predetermined method. The recording_seed in the case of the mark.tidx file is a random number value used for processing of encrypting data in the mark.tdat file, and is calculated by a predetermined method.

A thumbnail_index field indicates an index number for the ref_to_tn_block_id field following the thumbnail_index. A value of 0xFFFF must not be used for the thumbnail_index. In the case of the menu.tidx file, the thumbnail_index is referred to by the ref_to_menu_thumbnail_index field in the UIAppInfoVolume( ) and PlayListMark( ). In the case of the mark.tidx file, the thumbnail_index is referred to by the ref_to_mark_thumbnail_index field in the PlayListMark( ) and ClipMark( ). A thumbnail_index of the same value must not repeat in the menu.tidx file or in the mark.tidx file.

A ref_to_tn_block_id field indicates one tn_block in the menu.tdat file in the case of the menu.tidx file. The tn_block stores a thumbnail picture corresponding to the thumbnail_index, or the index number of the ref_to_tn_block_id field. Alternatively, the ref_to_tn_block_id field indicates one tn_block in the mark.tdat file in the case of the mark.tidx file. The tn_block stores a thumbnail picture corresponding to the thumbnail_index, or the index number of the ref_to_tn_block_id field.

A picture_byte_size field [ref_to_tn_block_id] indicates, in bytes, the length of data of the thumbnail picture stored in the tn_block indicated by the ref_to_tn_block_id field.

A horizontal_picture_size field [ref_to_tn_block_id] indicates the number of pixels in a horizontal direction of the thumbnail picture stored in the tn_block indicated by the ref_to_tn_block_id field.

A vertical_picture_size field [ref_to_tn_block_id] indicates the number of pixels in a vertical direction of the thumbnail picture stored in the tn_block indicated by the ref_to_tn_block_id field.

A flag_encrypted_thumbnail field [ref_to_tn_block_id] is a flag indicating whether the thumbnail picture stored in the tn_block indicated by the ref_to_tn_block_id field is recorded after being encrypted or recorded without being encrypted.

FIG. 25 shows the syntax structure of the "menu.tdat" and the "mark.tdat" files. These files have the same syntax structure.

A tn_block field (tn_block_id) indicates one tn_block by the argument of a tn_block_id in a tn_block sequence. In the case of the menu.tdat file, the value of the tn_block_id is referred to by the ref_to_tn_block_id field in the menu.tidx file. In the case of the mark.tdat file, the value of the tn_block_id is referred to by the ref_to_tn_block_id field in the mark.tidx file.

The contents of the tn_block (tn_block_id) are the same as described with reference to FIG. 16 and FIG. 17.

Three methods for managing encrypted thumbnails and non-encrypted thumbnails using databases have been described above. The effects of each of the methods are as follows.

The thumbnail picture files are each divided into two files for encrypted thumbnails and for non-encrypted thumbnails (FIG. 13 and FIG. 14).

Since encryption ON/OFF switching is not performed in the thumbnail picture files, decryption ON/OFF switching is not required at the time of reading the files (at the time of reproduction), and therefore decryption processing can be simplified.

(2) Switching between encrypted thumbnail portions and non-encrypted thumbnail portions is performed within a single Menu Thumbnail picture file, and the switching between encryption and non-encryption is performed in a unit of a tn_block (FIG. 21 and FIG. 22).

A database management for distinguishing between encrypted thumbnails and non-encrypted thumbnails is easy even in the case of the single thumbnail picture file. When the switching between encryption and non-encryption is performed in the minimum unit of a tn_block, it is not necessary to record additional data on the disk.

Figure 23:
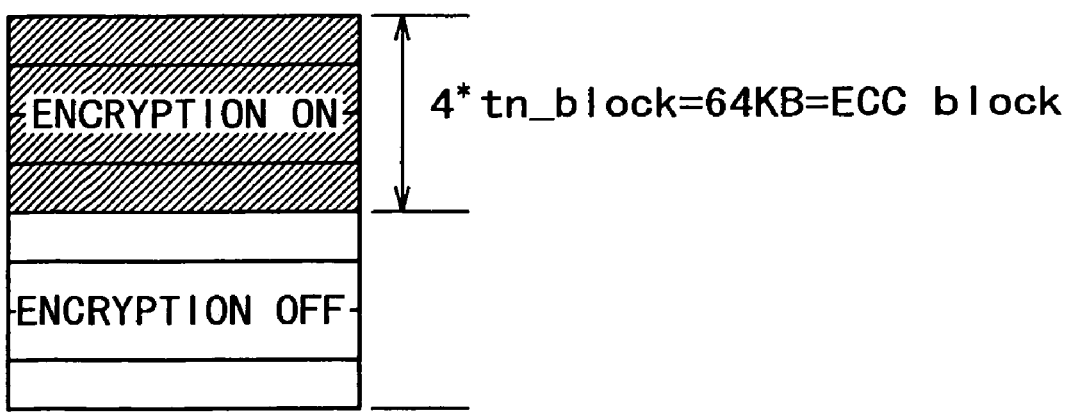
FIG. 23 is a diagram of assistance in explaining encryption in units of an ECC block.

(3) Switching between encrypted thumbnail portions and non-encrypted thumbnail portions is performed within a single Menu Thumbnail picture file, and the switching between encryption and non-encryption is performed in a unit of a plurality of connected tn_blocks (FIG. 23).

A database management for distinguishing between encrypted thumbnails and non-encrypted thumbnails is easy even in the case of the single thumbnail picture file. When the unit of a plurality of connected tn_blocks is set to be the same as an ECC block unit, decryption ON/OFF switching is not required at the time of reading an ECC block (at the time of reproduction), and therefore decryption processing can be simplified.

Next, FIG. 26 is a block diagram of a recording apparatus for recording an AV stream and coding a representative picture of the AV stream and a picture at a mark point into thumbnails and recording the thumbnails.

The recording of an AV stream obtained by self-encoding a video and an audio input from terminals 12 and 16 will first be described. A macrovision detecting unit 13 detects an analog copy protection signal (APS) of the input video by a predetermined method to restrict video information recording. Only when the input video information includes no APS, the video information is recordable. Hence, when the video information is recordable, the APS indicates "copy free." When the input video information includes no APS, the macrovision detecting unit 13 supplies the input video to a CGMS detecting and updating unit 14. The CGMS detecting and updating unit 14 analyzes a CGMS (CGMS-A or CGMS-D) of the input video by a predetermined method, and then supplies a controller 21 with CCI (indicated by CCI_o in FIG. 26) of an AV stream to be recorded. Also, the CGMS detecting and updating unit 14 supplies the input video to a WM (Water Mark) detecting and updating unit 15. The WM detecting and updating unit 15 analyzes a Water Mark of the input video by a predetermined method, and then supplies the controller 21 with a WM (indicated by WM_o in FIG. 26) of the AV stream to be recorded. Also, the WM detecting and updating unit 15 supplies the input video to an MPEG2 AV encoder 16 and a video analyzing unit 18.

The MPEG2 AV encoder 16 encodes the input video and audio signals, and then supplies a resulting video stream and audio stream to a multiplexing and source packetizing unit 17.

The controller 21 determines a value of E_CCI (Embedded CCI) to be encoded in a multiplexed stream by a predetermined method on the basis of the CCI_o and the WM_o input to the controller 21, and then supplies the E_CCI value to the multiplexing and source packetizing unit 17. The multiplexing and source packetizing unit 17 multiplexes the video stream and the audio stream, and then supplies a resulting AV stream to an encrypting unit 22 and a stream analyzing unit 20.

The encrypting unit 22 encrypts the AV stream input thereto by a predetermined method, and then supplies the result to an ECC encoding unit 23. The AV stream is processed by the ECC encoding unit 23, a modulating unit 24, and a drive 25, and thereafter is recorded on a recording medium 26 as an AV stream file.

The recording apparatus records the AV stream file and also records application database information (info.dvr, PlayLists, Clip Information, thumbnail information files, and thumbnail picture files) related to the AV stream file. The application database information is generated by the controller 21. Information input to the controller 21 is characteristic information of the video information from the video analyzing unit 18, characteristic information of the AV stream from the stream analyzing unit 20, and user instruction information input from a terminal 11.

The characteristic information of the video information from the video analyzing unit 18 is automatically generated by the recording apparatus. The video analyzing unit 18 analyzes the input video information, and generates information related to a characteristic picture in the input video information or a picture at a mark point. For example, the video analyzing unit 18 generates information specifying a picture at a mark point, such as the program start point of the input video information, a scene change point, a commercial start or end point or the like. A picture at a first mark point in the input video information may be set to be a representative picture of the video information (a representative picture of a PlayList). The video analyzing unit 18 inputs a time stamp (mark position) indicating a picture at a mark point in the video information to the controller 21. A thumbnail encoder 19 encodes the picture at the mark point into a thumbnail picture, and supplies the thumbnail picture to the controller 21. The controller 21 stores the time stamp of the mark point, the CCI_o and WM_o corresponding to the picture at the mark point, and the thumbnail picture of the picture at the mark point in association with one another. Also, the controller 21 determines the value of the above-mentioned CCI_thumbnail (FIG. 19) of the CP_Info_thumbnail( ) (FIG. 17 and FIG. 18) by a predetermined method on the basis of the CCI_o and WM_o corresponding to the picture at the mark point.

FIG. 27 shows a summary of copy control processing when the AV stream obtained by self-encoding the input video information is recorded.

The AV stream is recorded in correspondence with the state of the input signal. A thumbnail is also recorded in correspondence with the state of the input signal. Specifically, when the input signal is "copy free," the thumbnail is recordable as with the AV stream. The CCI_thumbnail or APS_thumbnail in this case is also "copy free." In this case, the thumbnail picture does not need to be encrypted, but may be encrypted.

When the state of the input signal is "no more copy" or "copy prohibited," the thumbnail picture is not recordable. When the state of the input signal is "copy once," the CCI_thumbnail is changed to "no more copy."

When the CCI_thumbnail of the thumbnail picture is "no more copy," the thumbnail needs to be encrypted. When the CCI_thumbnail of the thumbnail picture is "copy free," on the other hand, the thumbnail does not need to be encrypted.

The controller 21 generates application database information related to thumbnails, and stores the application database information in the thumbnail information files, the thumbnail picture files, and other database files (the info.dvr file, the PlayList files, and the Clip Information files) on the basis of the syntax described above. The controller 21 supplies the file information to the encrypting unit 22. When a thumbnail needs to be encrypted, the encrypting unit 22 encrypts the thumbnail by a method described above. The encrypting unit 22 supplies the file information to the ECC encoding unit 23. The file information is processed by the ECC encoding unit 23, the modulating unit 24, and the drive 25, and thereafter recorded on the recording medium 26.

The recording of a transport stream (TS) input from a terminal 27 will next be described. An E_CCI (Embedded CCI) analyzing and updating unit 28 analyzes E_CCI (Embedded CCI) encoded in the input TS by a predetermined method, and then supplies the controller 21 with CCI (indicated by CCI_o in FIG. 26) of an AV stream to be recorded. Also, the E_CCI analyzing and updating unit 28 supplies the input TS to a WM detecting and updating unit 29. The WM detecting and updating unit 29 analyzes a Water Mark of the input TS by a predetermined method, and then supplies the controller 21 with a WM (indicated by WM_o in FIG. 26) of the AV stream to be recorded. Also, the WM detecting and updating unit 29 supplies the input TS to the multiplexing and source packetizing unit 17. The multiplexing and source packetizing unit 17 converts the input TS into a stream of a source packet string, and then supplies the stream to the stream analyzing unit 20 and the encrypting unit 22. The encrypting unit (scrambling unit) 22 encrypts the AV stream input thereto by a predetermined method, and then supplies the result to the ECC encoding unit 23. The AV stream is processed by the ECC encoding unit 23, the modulating unit 24, and the drive 25, and thereafter recorded on the recording medium 26 as an AV stream file.

The input TS from the terminal 27 is also input to a decoder 30. The decoder 30 decodes a video stream of the input TS, and then supplies video information to the video analyzing unit 18. The processing of the video analyzing unit 18 and the thumbnail encoder 19 is the same as in the processing of self-encoding the input video.

The stream analyzing unit 20 analyzes contents protection information (DTCP_descriptor or the like) in the input stream, then extracts analog copy protection information (APS), and supplies the analog copy protection information (APS) to the controller 21. The APS corresponding to mark point pictures of the input stream and the APS_thumbnail of thumbnail pictures of the mark point pictures are set to the same value. The value of the CCI_thumbnail is determined by the controller 21 as in the self-encoding and recording of the input video.

FIG. 28 shows a summary of copy control processing when the input TS is recorded.

The processing shown in FIG. 28 is basically the same as in FIG. 27, but the APS_thumbnail of a thumbnail picture is set to be the same as the state of the input signal.

When the CCI_thumbnail of the thumbnail picture is "no more copy," the thumbnail needs to be encrypted. When the CCI_thumbnail of the thumbnail picture is "copy free," on the other hand, the thumbnail does not need to be encrypted.

The controller 21 generates application database information related to thumbnails, and stores the application database information in the thumbnail information files, the thumbnail picture files, and other database files (the info.dvr file, the PlayList files, and the Clip Information files) on the basis of the syntax described above. The controller 21 supplies the file information to the encrypting unit 22. When a thumbnail needs to be encrypted, the encrypting unit 22 encrypts the thumbnail by a method described above. The encrypting unit 22 supplies the file information to the ECC encoding unit 23. The file information is processed by the ECC encoding unit 23, the modulating unit 24, and the drive 25, and thereafter recorded on the recording medium 26.

Figure 29:
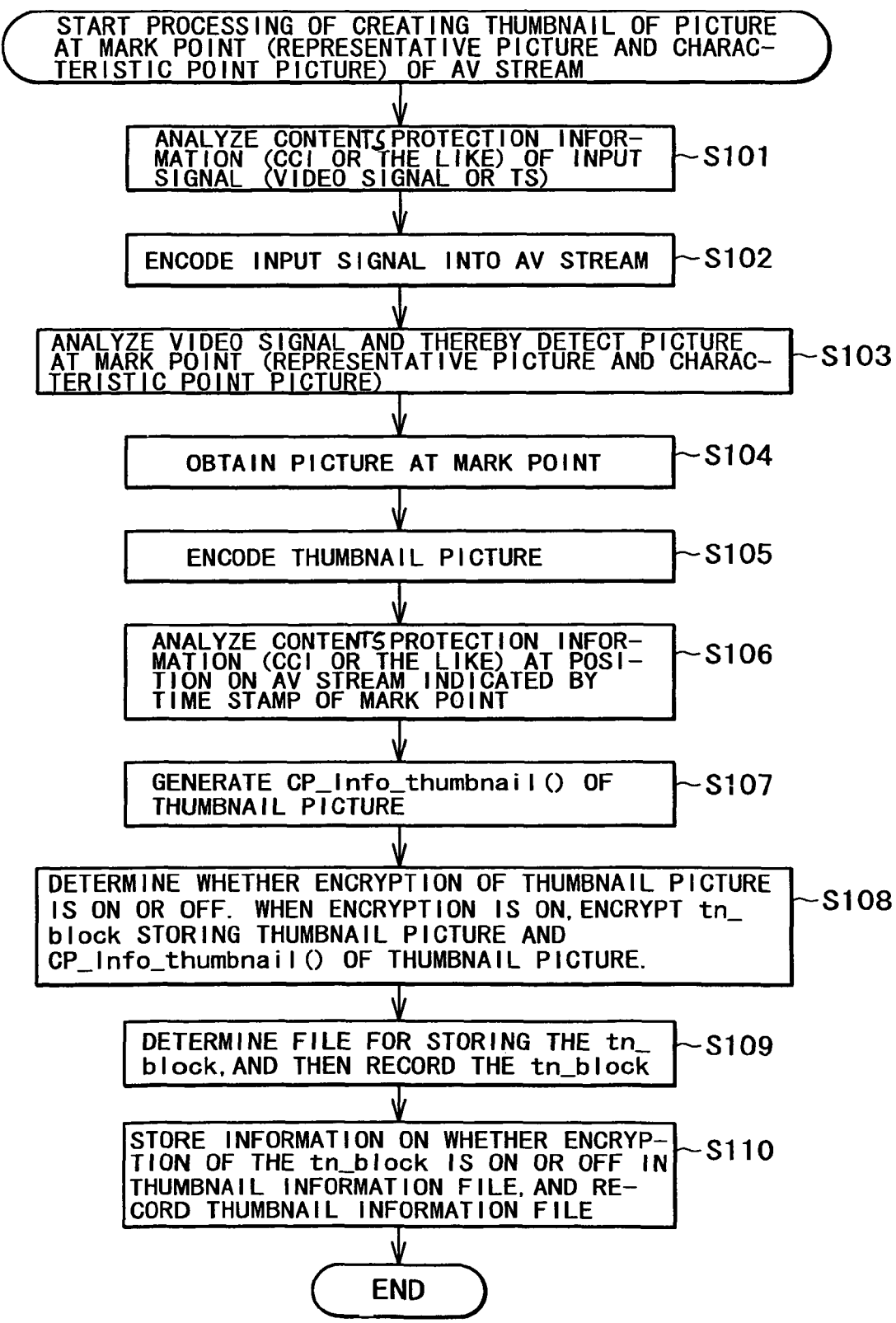
FIG. 29 is a flowchart explaining the process of encrypting and recording a thumbnail.

FIG. 29 is a flowchart of the process of recording an AV stream, coding a representative picture of the AV stream and a picture at a characteristic point into thumbnails and recording the thumbnails.

At step S101, contents protection information (CCI or the like) of an input signal (video information or a TS) is analyzed. This processing is performed by the macrovision detecting unit 13, the CGMS detecting and updating unit 14, the WM detecting and updating unit 15, the E_CCI analyzing and updating unit 28, or the WM detecting and updating unit 29.

At step S102, the input signal is encoded into an AV stream. This processing is performed by the MPEG2 AV encoder 16 and the multiplexing and source packetizing unit 17.

At step S103, the video analyzing unit 18 analyzes the video information and thereby detects pictures at mark points (a representative picture and characteristic point picture).

At step S104, the video analyzing unit 18 obtains the pictures at the mark points.

At step S105, the thumbnail encoder 19 encodes the pictures at the mark points into thumbnail pictures.

At step S106, the controller 21 analyzes contents protection information (CCI or the like) at positions on the AV stream that are indicated by time stamps of the mark points.

At step S107, the controller 21 generates the CP_Info_thumbnail( ) of the thumbnail pictures. Specifically, the controller 21 determines the values of the CCI_thumbnail (FIG. 19) and the APS_thumbnail (FIG. 20), as described above.

At step S108, the controller 21 determines whether encryption of the thumbnail pictures is ON or OFF. When the encryption is ON, the encrypting unit 22 encrypts a tn_block storing the thumbnail picture and the CP_Info_thumbnail( ) of the thumbnail picture.

At step S109, the controller 21 determines a file for storing the tn_block, and then records the tn_block on the recording medium 26. Concrete recording processing is performed by the ECC encoding unit 23, the modulating unit 24, and the drive 25.

At step S110, the controller 21 stores information on whether encryption of the tn_block is ON or OFF in a thumbnail information file, and records the thumbnail information file on the recording medium 26. Concrete recording processing is performed by the ECC encoding unit 23, the modulating unit 24, and the drive 25.

Figure 30:
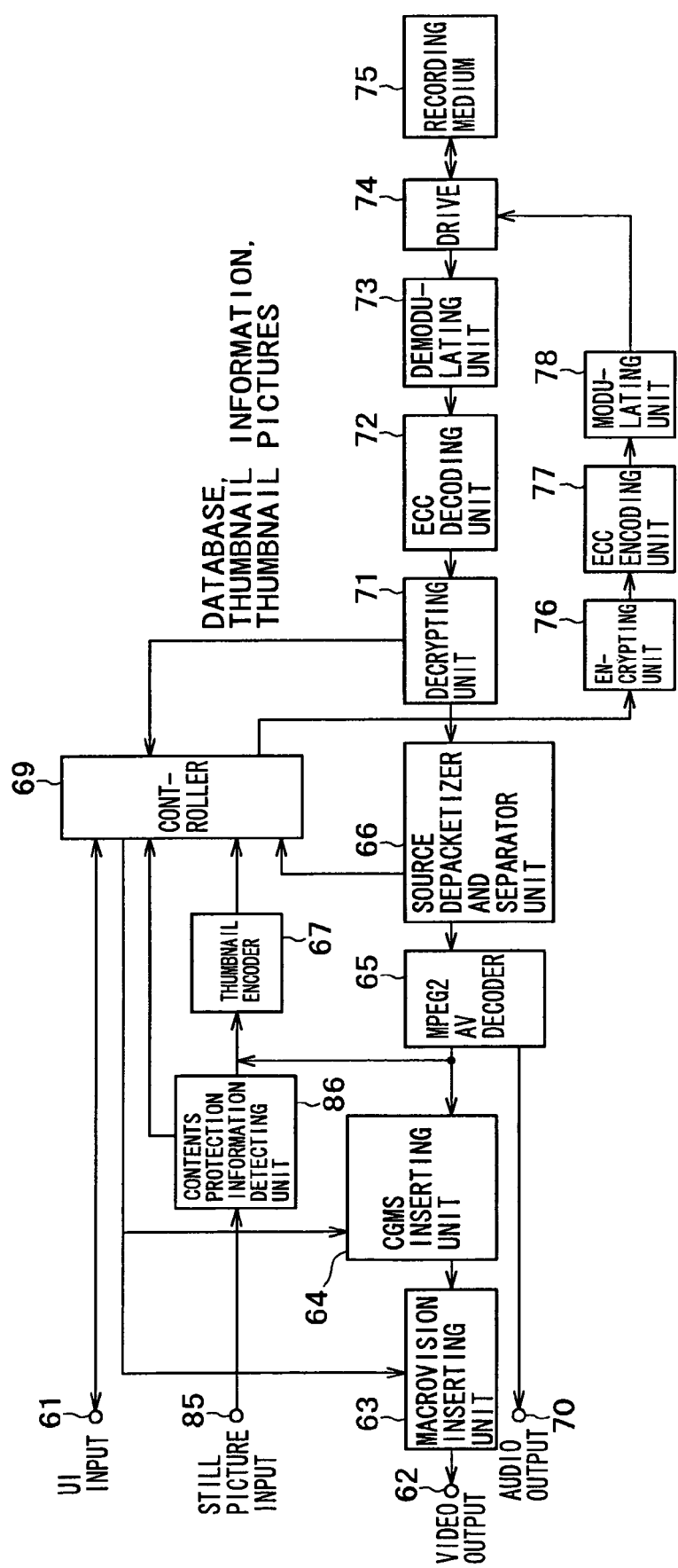
FIG. 30 is a block diagram showing another configuration of a recording apparatus to which the present invention is applied.

Next, FIG. 30 is a block diagram of a recording apparatus for adding a thumbnail of a picture specified by a user to a recorded AV stream and thereby recording the thumbnail.

An application database read from a recording medium (disk) 75 through a drive 74 is processed by a demodulating unit 73, an ECC decoding unit 72, and a decrypting unit 71, and then input to a controller 69. The controller 69 generates a menu screen for describing contents recorded on the recording medium 75, and then displays the menu screen on a monitor (not shown). The user selects a PlayList desired to be played through a UI (User Interface) input from a terminal 61. The controller 69 issues an instruction to read from the recording medium 75 an AV stream required to play the PlayList specified by the user.

An AV stream file read from the recording medium 75 through the drive 74 is processed by the demodulating unit 73, the ECC decoding unit 72, and the decrypting unit 71, and then input to a source depacketizer and separator unit 66. A video stream separated by the source depacketizer and separator unit 66 is decoded by an MPEG2 AV decoder 65 to output video information. The video information is subjected to predetermined processing at a CGMS inserting unit 64 and a macrovision inserting unit 63, output from a terminal 62, and then displayed on the monitor (not shown).

The user issues an instruction to the controller 69 through a UI input from the terminal 61 to specify a scene to be marked (a favorite scene, for example) from the reproduced video.

A thumbnail picture to be added at a mark point and recorded may be generated from a picture at the mark point, or may be generated from a picture captured from a personal computer, a digital still camera or the like into the recording apparatus via an external input.

When the thumbnail picture is generated from the picture at the mark point, the controller 69 obtains a time stamp of the picture marked by the user from the source depacketizer and separator unit 66. Then, the picture at the mark point is obtained from the MPEG2 AV decoder 65 to be input to a thumbnail encoder 67. The thumbnail encoder 67 encodes the thumbnail picture and inputs the thumbnail picture to the controller 69. The source depacketizer and separator unit 66 extracts contents protection information (DTCP descriptor or the like) at a position on the AV stream which is indicated by the time stamp of the mark point, and then inputs the contents protection information (DTCP descriptor or the like) to the controller 69. The controller 69 analyzes the contents protection information (DTCP_descriptor or the like) to extract CCI and analog copy protection information (APS). Then, the values of a CCI_thumbnail and an APS_thumbnail of a CP_Info_thumbnail( ) for the thumbnail picture of the picture at the mark point are set to be the same as the values of the above CCI and APS, respectively.

A description will next be made of the operation when the thumbnail picture to be added at the mark point and recorded is generated from a still picture captured from a personal computer, a digital still camera or the like and input into the recording apparatus via an external input. The controller 69 obtains the still picture from an external input terminal 85. Then, a contents protection information detecting unit 86 extracts contents protection information (CGMS, APS, DTCP descriptor or the like) of the input picture, and inputs the contents protection information to the controller 69. The controller 69 analyzes the contents protection information to extract CCI and analog copy protection information (APS). Then, the values of a CCI_thumbnail and an APS_thumbnail of a CP_Info_thumbnail( ) for the thumbnail picture are set to be the same as the values of the above CCI and APS, respectively. The still picture is input to the thumbnail encoder 67. The thumbnail encoder 67 encodes the thumbnail picture and inputs the thumbnail picture to the controller 69.

When the CCI_thumbnail of the thumbnail picture is "no more copy," the thumbnail needs to be encrypted. When the CCI_thumbnail of the thumbnail picture is "copy free," on the other hand, the thumbnail does not need to be encrypted.

The controller 69 generates application database information related to thumbnails, and stores the application database information in the thumbnail information files, the thumbnail picture files, and other database files (the info.dvr file, the PlayList files, and the Clip Information files) on the basis of the syntax described above. The controller 69 supplies the file information to an encrypting unit 76. When a thumbnail needs to be encrypted, the encrypting unit 76 encrypts the thumbnail by a method described above. The encrypting unit 76 supplies the file information to an ECC encoding unit 77. The file information is processed by the ECC encoding unit 77, a modulating unit 78, and the drive 74, and thereafter recorded on the recording medium 75.

Figure 31:
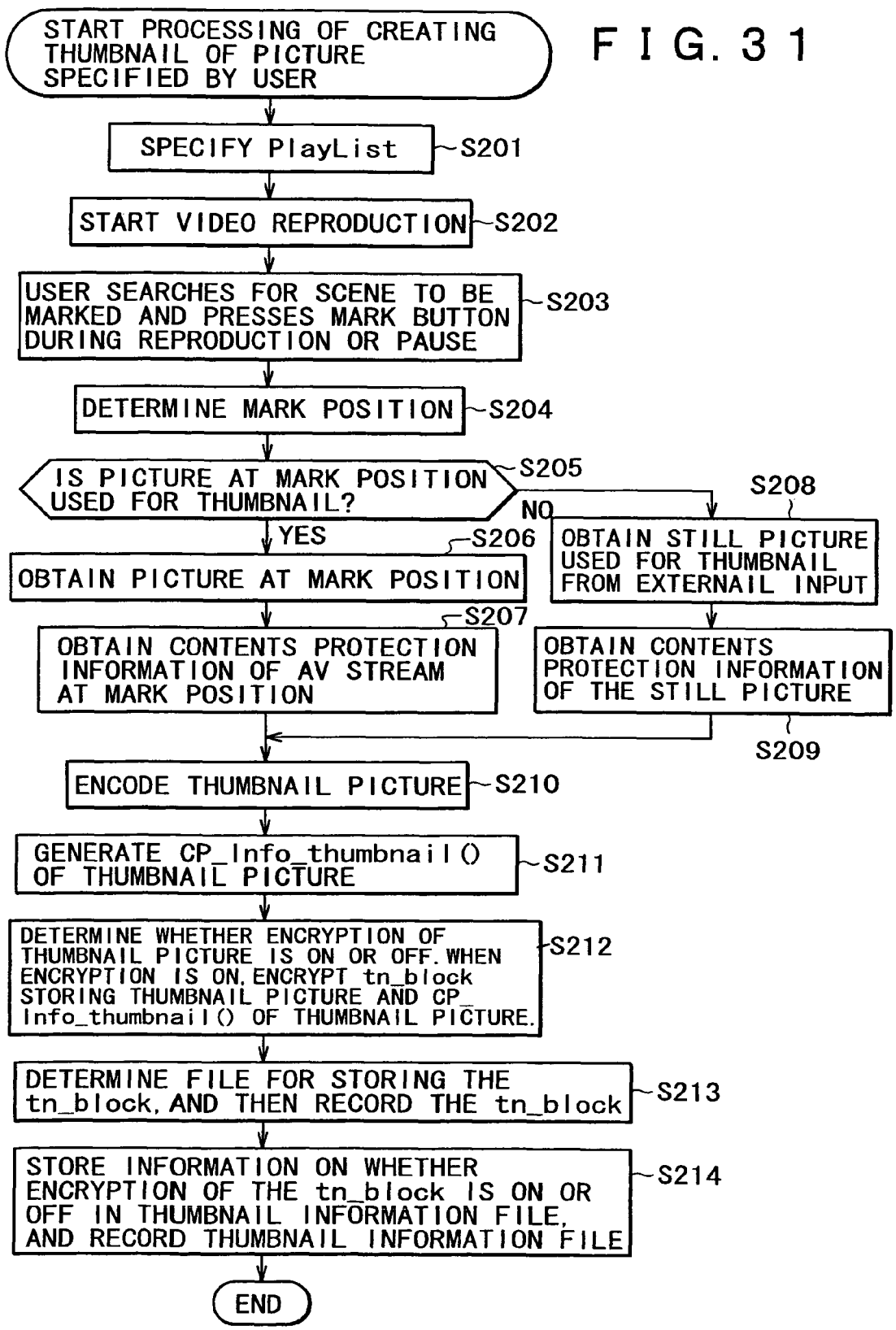
FIG. 31 is a flowchart explaining the process of adding and recording a thumbnail of a specified picture.

FIG. 31 is a flowchart of the process of adding a thumbnail of a picture specified by a user to a recorded AV stream and recording the thumbnail.

At step S201, when a PlayList to be played is specified by the user via the UI, the controller 69 obtains the PlayList.

At step S202, the controller 69 starts reproduction of the video of the specified PlayList. Concrete reproduction processing is performed by the recording medium 75, the drive 74, the demodulating unit 73, the ECC decoding unit 72, and the decrypting unit 71.

At step S203, when the user searches for a scene to be marked and presses a mark button during the reproduction or a pause, this input is given to the controller 69 via the UI.

At step S204, the controller 69 determines a mark position on the basis of the input.

At step S205, the controller 69 determines whether the user uses a picture at the mark position for a thumbnail or obtains a still picture used for the thumbnail from the external input. This determination is made by displaying a predetermined message and obtaining an input in response to the message from the user. When the picture at the mark position is used for the thumbnail, the processing proceeds to step S206. When a still picture used for the thumbnail is obtained from the external input, the processing proceeds to step S208.

At step S206, the source depacketizer and separator unit 66 obtains the picture at the mark position.

At step S207, the source depacketizer and separator unit 66 obtains contents protection information of the AV stream at the mark position.

When the controller 69 determines at step S205 that a still picture used for the thumbnail has been obtained from the external input, the contents protection information detecting unit 86 obtains the still picture used for the thumbnail from the external input at step S208.

At step S209, the contents protection information detecting unit 86 obtains contents protection information of the still picture.

At step S210, the thumbnail encoder 67 encodes the picture used for the thumbnail into a thumbnail picture.

At step S211, the controller 69 generates the CP_Info_thumbnail( ) of the thumbnail picture. Specifically, the controller 69 determines the values of the CCI_thumbnail and the APS_thumbnail, as described above.

At step S212, the controller 69 determines whether encryption of the thumbnail picture is ON or OFF. When the encryption is ON, the encrypting unit 76 encrypts a tn_block storing the thumbnail picture and the CP_Info_thumbnail( ) of the thumbnail picture.

At step S213, the controller 69 determines a file for storing the tn_block, and then records the tn_block on the recording medium 75. This recording is performed by the ECC encoding unit 77, the modulating unit 78, and the drive 74.

At step S214, the controller 69 stores information on whether encryption of the tn_block is ON or OFF in a thumbnail information file, and records the thumbnail information file on the recording medium 75.

Figure 32:
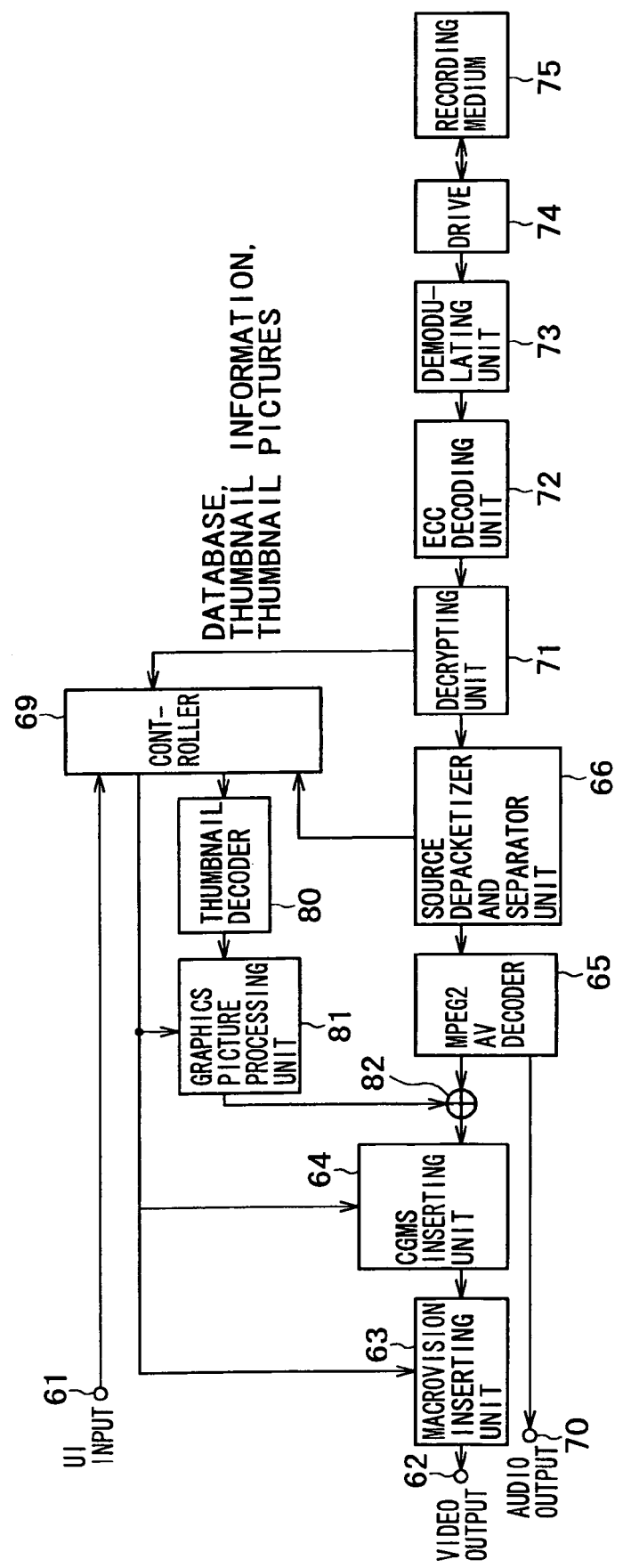
FIG. 32 is a block diagram showing an example configuration of a reproducing apparatus to which the present invention is applied.

Next, FIG. 32 is a block diagram of a reproducing apparatus for reproducing an AV stream and reproducing thumbnails of a representative picture of the AV stream and a characteristic point picture.

An application database read from a recording medium 75 through a drive 74 is processed by a demodulating unit 73, an ECC decoding unit 72, and a decrypting unit 71, and then input to a controller 69.

The controller 69 determines a thumbnail picture for display through a video output. For example, the controller 69 determines that a thumbnail of a representative picture of a PlayList is displayed.

The controller 69 reads information related to the thumbnail picture from a thumbnail information file. The controller 69 thereby knows the thumbnail picture file in which the thumbnail picture is stored, and knows whether encryption of the thumbnail picture is ON or OFF.

The controller 69 next reads data of the thumbnail picture from the thumbnail picture file. When the thumbnail picture is encrypted, the decrypting unit 71 decrypts the encrypted thumbnail picture. The controller 69 also obtains a CP_Info_thumbnail( ) for the thumbnail picture to be reproduced.

The controller 69 inputs the thumbnail picture to a thumbnail decoder 80, and a decoded picture is input to a graphics picture processing unit 81. An output picture resulting from predetermined processing by the graphics picture processing unit 81 is processed by a picture blender processing unit 82, and then input to a CGMS inserting unit 64.

The CGMS inserting unit 64 inserts into the output picture a CGMS signal having the same meaning as a CCI_thumbnail of the CP_Info_thumbnail( ) for the thumbnail picture. A macrovision inserting unit 63 next inserts into the output picture an analog copy protection signal having the same meaning as an APS_thumbnail of the CP_Info_thumbnail( ). Then, video is reproduced from a terminal 62.

Figure 33:
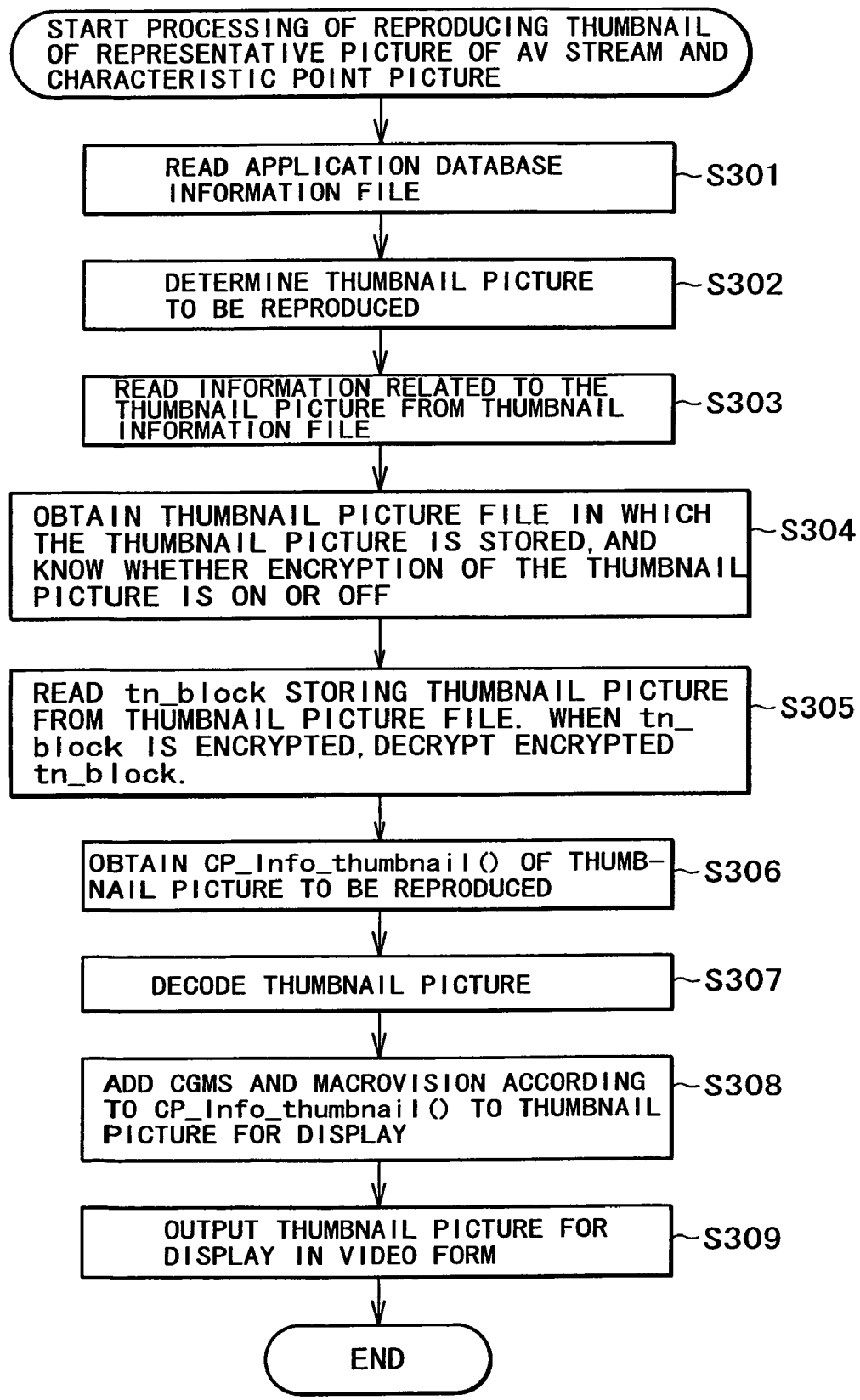
FIG. 33 is a flowchart explaining the process of reproducing a thumbnail.

FIG. 33 is a flowchart of a reproducing operation for reproducing thumbnails of a representative picture of an AV stream and a characteristic point picture.

At step S301, the controller 69 causes an application database information file to be read. Specifically, the reading processing is performed by the recording medium 75, the drive 74, the demodulating unit 73, the ECC decoding unit 72, and the decrypting unit 71.

At step S302, the controller 69 determines a thumbnail picture to be reproduced on the basis of an input from a UI.

At step S303, the controller 69 reads information related to the thumbnail picture from a thumbnail information file.

At step S304, the controller 69 obtains the thumbnail picture file in which the thumbnail picture is stored, and knows whether encryption of the thumbnail picture is ON or OFF.

At step S305, the controller 69 reads a tn_block storing the thumbnail picture from the thumbnail picture file. When the tn_block is encrypted, the decrypting unit 71 decrypts the encrypted tn_block.

At step S306, the controller 69 obtains a CP_Info_thumbnail( ) of the thumbnail picture to be reproduced from the output of the source depacketizer and separator unit 66.

At step S307, the controller 69 supplies the thumbnail picture to the thumbnail decoder 80 to decode the thumbnail picture. The thumbnail picture is processed by the graphics picture processing unit 81, and then supplied from the picture blender processing unit 82 to the CGMS inserting unit 64.

At step S308, the controller 69 controls the CGMS inserting unit 64 and the macrovision inserting unit 63 to add CGMS and macrovision according to the CP_Info_thumbnail( ) obtained by the processing of step S306 to the thumbnail picture for display.

At step S309, the controller 69 outputs the thumbnail picture for display in a video form from the terminal 62.

Thus, the present invention enables the following.

Since thumbnail pictures are encrypted, it is possible to protect the copyright of the thumbnail pictures.

When an AV stream is recorded and also a representative picture of the AV stream and thumbnail pictures representing characteristic points are recorded, information for distinguishing between encrypted thumbnail pictures and non-encrypted thumbnail pictures is recorded. Therefore, in a case where encrypted thumbnail pictures and non-encrypted thumbnail pictures may be mixed with each other on a recording medium, the thumbnail pictures recorded after being encrypted and the thumbnail pictures recorded without being encrypted can be managed distinguishably.

In (2), a thumbnail picture file for storing the thumbnail pictures and a thumbnail information file for storing the information for distinguishing between the encrypted thumbnail pictures and the non-encrypted thumbnail pictures are recorded separately from each other. Therefore, the thumbnail information file can be managed in a database of a relatively small size. Thus, when an instruction for reproduction of a thumbnail picture is given, information on whether the thumbnail is encrypted or not can be obtained readily and quickly.

In (3), the thumbnail picture file is divided into two files for the encrypted thumbnails (menu.tdt1) and for the non-encrypted thumbnails (menu.tdt2), and the two files are recorded. Therefore, encryption ON/OFF switching is not performed in the thumbnail picture file. Thus, decryption ON/OFF switching is not required at the time of reading the file (at the time of reproduction), and therefore decryption processing can be simplified.

In (3), switching between encrypted thumbnail portions and non-encrypted thumbnail portions is performed for recording in the single thumbnail picture file. A database management for distinguishing between encrypted thumbnails and non-encrypted thumbnails is easy even in the case of the single thumbnail picture file. When the switching between encryption and non-encryption is performed in a unit of a tn_block, the switching between encryption and non-encryption is performed in the minimum unit of a tn_block, and therefore it is not necessary to record additional data on the disk. The switching between encryption and non-encryption may also be performed in a unit of a plurality of connected tn_blocks. When the unit of a plurality of connected tn_blocks is set to be the same as an ECC block unit, for example, decryption ON/OFF switching is not required at the time of reading an ECC block (at the time of reproduction), and therefore decryption processing can be simplified.

In (2), contents protection information (CP_Info_thumbnail( )) is added to a thumbnail picture, and then recorded.

In (6), the thumbnail picture and the contents protection information of the thumbnail picture are recorded in a unit of a block (tn_block) of predetermined size.

In (6), encryption processing is closed in one tn_block.

In (2), when CCI of an original picture from which a thumbnail picture is generated is "copy once," the thumbnail picture is encrypted and then recorded.

With (6) to (9), it is possible to prevent information of the CP_Info_thumbnail( ) from being altered by a malicious user. In addition, even if a thumbnail picture having a CCI_thumbnail indicating "no more copy" is illegally copied onto another recording medium as identical data on a bit-by-bit basis, it is possible to prevent decryption and reproduction of the thumbnail picture and thus prevent use of the thumbnail picture.

With (8), in which encryption processing is closed in one tn_block, when an arbitrary thumbnail picture is to be read from the thumbnail picture file, it suffices to decrypt only the tn_block that stores the thumbnail picture, so that an amount of data processing can be minimized.

(10) In (2), when the format of the thumbnail pictures is JPEG, JPEG is implemented relatively easily and has a high degree of compatibility, because JPEG is widely used as a de facto standard.

(11) When a thumbnail picture is to be reproduced from a recording medium on which video information, a representative picture of the video information, and thumbnail pictures representing characteristic points are recorded, information for distinguishing between encrypted thumbnail pictures and non-encrypted thumbnail pictures is read, and then the thumbnail picture is reproduced on the basis of the information. Therefore, in a case where the encrypted thumbnail pictures and the non-encrypted thumbnail pictures may be mixed with each other on the recording medium, the thumbnail pictures recorded after being encrypted and the thumbnail pictures recorded without being encrypted can be managed distinguishably.

It is to be noted that while in the above description, the thumbnail picture file and the thumbnail information file are managed as separate files, information in the thumbnail picture file and the thumbnail information file may be collected and managed in a single file. For example, an object for collecting information on whether each thumbnail picture is encrypted and an object for collecting thumbnail pictures may be managed in a single file.

In addition, data does not necessarily need to be managed in the form of files (managed by using a file system); it suffices to manage data with objects manageable by the recording apparatus/reproducing apparatus.

Furthermore, while in the above description, the recording apparatus and the reproducing apparatus have been shown as configurations separate from each other, the recording apparatus and the reproducing apparatus can of course be integrated into a recording and reproducing apparatus capable of both recording and reproduction. In this case, blocks corresponding to each other of the blocks shown in FIG. 26, FIG. 30, and FIG. 32 are the same block as required.

Furthermore, while in the above description, the present invention records or reproduces AV streams, the present invention is also applicable in a case where only video information is recorded or reproduced.

According to the present invention, in a case where encrypted thumbnail pictures and non-encrypted thumbnail pictures may be mixed with each other on a recording medium, the thumbnail pictures recorded after being encrypted and the thumbnail pictures recorded without being encrypted can be managed distinguishably.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A video information reproducing apparatus, comprising:
a reproducing unit operable to reproduce a signal recorded on a recording medium;
an extracting unit operable to extract thumbnail picture information from said reproduced signal, said thumbnail picture information including encrypted thumbnail picture information and non-encrypted thumbnail picture information;
a decrypting unit operable to decrypt said encrypted thumbnail picture information; and
an output unit operable to output said decrypted thumbnail picture information;
wherein said reproducing unit reproduces said encrypted thumbnail picture information and said non-encrypted thumbnail picture information using a predetermined block of an identical object as a unit, and said extracting unit further extracts distinguishing information from said reproduced signal, said distinguishing information distinguishing said encrypted thumbnail picture information.

2. The video information reproducing apparatus as claimed in claim 1, further comprising a determining unit operable to determine whether said thumbnail picture information is to be decrypted on the basis of said distinguishing information.

3. The video information reproducing apparatus as claimed in claim 1, wherein said extracting unit further extracts contents protection information for said thumbnail picture information.

4. The video information reproducing apparatus as claimed in claim 3, wherein said decrypting unit further decrypts said contents protection information.

5. The video information reproducing apparatus as claimed in claim 4, wherein said reproducing unit reproduces said thumbnail picture information using a predetermined block as a unit.

6. The video information reproducing apparatus as claimed in claim 5, wherein said decrypting unit decrypts one piece of said thumbnail picture information within said predetermined block.

7. The video information reproducing apparatus as claimed in claim 6, wherein said reproducing unit reproduces said thumbnail picture information and said distinguishing information from respective objects independent of each other.

8. The video information reproducing apparatus as claimed in claim 7, wherein said thumbnail picture information includes said encrypted thumbnail picture information and non-encrypted thumbnail picture information, and said reproducing unit reproduces said encrypted thumbnail picture information from a first object of said object of said thumbnail picture information and reproduces said non-encrypted thumbnail picture information from a second object of said object of said thumbnail picture information.

9. The video information reproducing apparatus as claimed in claim 1, wherein said predetermined block is a block of an error correction unit.

10. A method for reproducing video information recorded on a recording medium, the method comprising:
reproducing a signal recorded on the recording medium;
extracting thumbnail picture information from the reproduced signal, said thumbnail picture information including encrypted thumbnail picture information and non-encrypted thumbnail picture information;
decrypting the encrypted thumbnail picture information; and
outputting the decrypted thumbnail picture information;
wherein said reproducing step includes reproducing said encrypted thumbnail picture information and said non-encrypted thumbnail picture information using a predetermined block of an identical object as a unit, and said extracting step further extracts distinguishing information from said reproduced signal, said distinguishing information distinguishing said encrypted thumbnail picture information.

11. The method for reproducing video information as claimed in claim 10, further comprising determining whether said thumbnail picture information is to be decrypted on the basis of said distinguishing information.

12. The method for reproducing video information as claimed in claim 10, wherein said extracting step further extracts contents protection information for said thumbnail picture information.

13. The method for reproducing video information as claimed in claim 12, wherein said decrypting step further decrypts said contents protection information.

14. The method for reproducing video information as claimed in claim 13, wherein said reproducing step reproduces said thumbnail picture information using a predetermined block as a unit.

15. The method for reproducing video information as claimed in claim 14, wherein said decrypting step decrypts one piece of said thumbnail picture information within said predetermined block.

16. The method for reproducing video information as claimed in claim 15, wherein said reproducing step reproduces said thumbnail picture information and said distinguishing information from respective objects independent of each other.

17. The method for reproducing video information as claimed in claim 16, wherein said thumbnail picture information includes said encrypted thumbnail picture information and non-encrypted thumbnail picture information, and said reproducing step reproduces said encrypted thumbnail picture information from a first object of said object of said thumbnail picture information and reproduces said non-encrypted thumbnail picture information from a second object of said object of said thumbnail picture information.

18. A recording medium having recorded thereon a computer readable program having instructions for carrying out a method of reproducing video information recorded on a further recording medium, said method comprising:

reproducing a signal recorded on the further recording medium;

extracting thumbnail picture information from the reproduced signal, said thumbnail picture information including encrypted thumbnail picture information and non-encrypted thumbnail picture information;

decrypting the encrypted thumbnail picture information; and outputting the decrypted thumbnail picture information;

wherein said reproducing step includes reproducing said encrypted thumbnail picture information and said non-encrypted thumbnail picture information using a predetermined block of an identical object as a unit, and said extracting step further extracts distinguishing information from said reproduced signal, said distinguishing information distinguishing said encrypted thumbnail picture information.

19. A system for reproducing video information recorded on a recording medium, said system comprising:

a processor encoded with instructions for carrying out a method of reproducing the video information recorded on the recording medium, the method including:

reproducing a signal recorded on the recording medium, extracting thumbnail picture information from the reproduced signal, said thumbnail picture information including encrypted thumbnail picture information and non-encrypted thumbnail picture information;

decrypting the encrypted thumbnail picture information, and outputting the decrypted thumbnail picture information, wherein said reproducing step includes reproducing said encrypted thumbnail picture information and said non-encrypted thumbnail picture information using a predetermined block of an identical object as a unit, and said extracting step further extracts distinguishing information from said reproduced signal, said distinguishing information distinguishing said encrypted thumbnail picture information.

* * * * *